(12) United States Patent
Yamazaki

(10) Patent No.: US 8,045,201 B2
(45) Date of Patent: Oct. 25, 2011

(54) PRINTING APPARATUS AND SYSTEM CAPABLE OF JUDGING WHETHER PRINT RESULT IS SUCCESSFUL

(75) Inventor: Yoshirou Yamazaki, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 1247 days.

(21) Appl. No.: 11/727,325

(22) Filed: Mar. 26, 2007

(65) Prior Publication Data

US 2007/0223023 A1    Sep. 27, 2007

(30) Foreign Application Priority Data

Mar. 27, 2006 (JP) .................................. 2006-086464

(51) Int. Cl.
 *G06F 3/12* (2006.01)
 *G06K 9/00* (2006.01)
(52) U.S. Cl. ............... 358/1.15; 358/1.13; 358/1.14; 358/1.18; 715/274; 382/112; 347/19
(58) Field of Classification Search .......... 358/1.14, 358/1.15, 1.9, 1.18, 453, 462, 1.12, 1.13; 382/112, 182; 725/153; 347/19; 715/274, 715/246
See application file for complete search history.

(56) References Cited

U.S. PATENT DOCUMENTS

| | | | |
|---|---|---|---|
| 6,665,425 B1 * | 12/2003 | Sampath et al. | 382/112 |
| 7,259,877 B2 * | 8/2007 | Inoo et al. | 358/1.13 |
| 7,380,899 B2 * | 6/2008 | Arakawa et al. | 347/19 |
| 7,446,873 B2 * | 11/2008 | Chandhok | 356/401 |
| 7,673,958 B2 * | 3/2010 | Heiles et al. | 347/19 |
| 2001/0016054 A1 * | 8/2001 | Banker et al. | 382/112 |
| 2003/0190169 A1 * | 10/2003 | Shibaki | 399/21 |

(Continued)

FOREIGN PATENT DOCUMENTS

JP    7-81191 A    3/1995

(Continued)

OTHER PUBLICATIONS

Japanese Notice of Reason for Rejection dated Jul. 12, 2010 for corresponding Japanese Application No. 2006-086464.

*Primary Examiner* — Twyler Haskins
*Assistant Examiner* — Dennis Dicker
(74) *Attorney, Agent, or Firm* — Birch, Stewart, Kolasch & Birch, LLP

(57) ABSTRACT

The printing apparatus includes: a printing device which prints onto a prescribed print medium; a print result prediction device which predicts a print result on the print medium and accordingly outputs print result prediction data including image region print result prediction data for an image region and text region print result prediction data for a text region, the image region and the text region being recognized as an image and a text, respectively, by a person viewing a correct print result, the text region print result prediction data including a text code; an image reading device which optically reads in the print result on the print medium and accordingly outputs print result read data, the image reading device being disposed on a downstream side of a printing position of the print medium and on an upstream side of an output position of the print medium in a conveyance path along which the print medium is conveyed; and a print result judgment device which judges a printing failure on the print medium in accordance with the print result prediction data outputted from the print result prediction device and the print result read data outputted from the image reading device.

4 Claims, 22 Drawing Sheets

U.S. PATENT DOCUMENTS

| | | | |
|---|---|---|---|
| 2003/0235328 A1* | 12/2003 | Nakamura et al. | 382/112 |
| 2004/0086156 A1* | 5/2004 | Furukawa et al. | 382/112 |
| 2004/0179717 A1* | 9/2004 | Furukawa et al. | 382/112 |
| 2008/0186537 A1* | 8/2008 | Isobe | 358/1.15 |

FOREIGN PATENT DOCUMENTS

| | | |
|---|---|---|
| JP | 2000-168054 A | 6/2000 |
| JP | 2001-277676 A | 10/2001 |
| JP | 2002-11926 A | 1/2002 |
| JP | 2002-288636 A | 10/2002 |
| JP | 2005-31548 A | 2/2005 |
| JP | 2005-59248 A | 3/2005 |
| JP | 2005-150987 A | 6/2005 |
| JP | 2005-153164 A | 6/2005 |
| JP | 2005-173757 A | 6/2005 |
| JP | 2005-205668 A | 8/2005 |

* cited by examiner

PRINT QUALITY DATA

411 — REGION INFORMATION FOR DIVIDING IMAGE REGION AND TEXT REGION

412 — IMAGE REGION JUDGMENT RESOLUTION
413 — TEXT REGION JUDGMENT RESOLUTION
414 — JUDGMENT VISUAL FILTER CHARACTERISTICS

415 — IMAGE REGION DATA:
416 — IMAGE DATA OF JUDGMENT RESOLUTION
417 — JUDGMENT THRESHOLD VALUE IMAGE DATA OF JUDGMENT RESOLUTION

418 — TEXT REGION DATA:
419 — TEXT STRING

FIG.12

PRINT RESULT PREDICTION DATA 440

- 441 — IMAGE REGION DATA:
- 442 — JUDGMENT IMAGE DATA
- 443 — JUDGMENT THRESHOLD VALUE IMAGE DATA
- 444 — TEXT REGION DATA:
- 419 — TEXT STRING

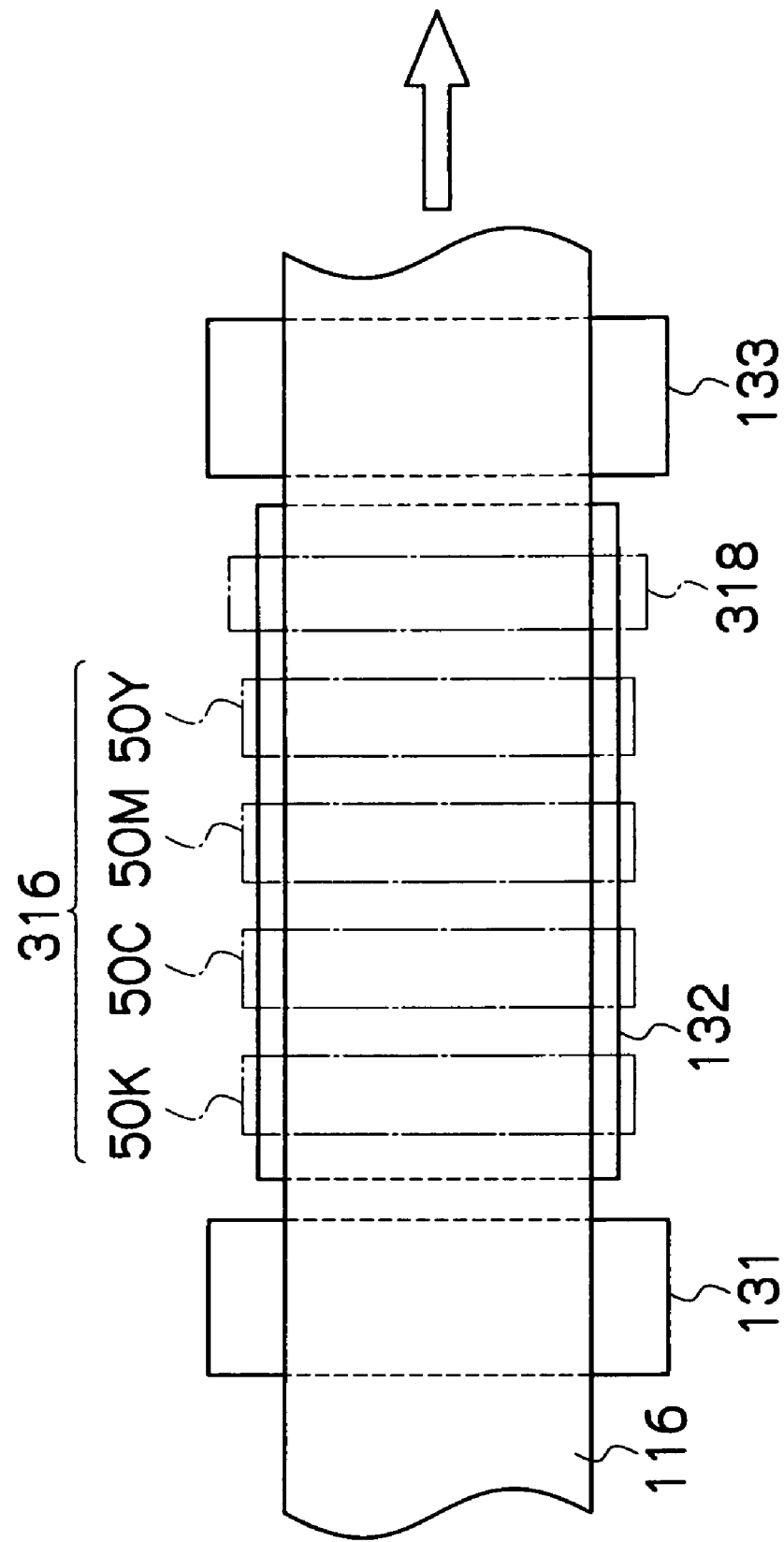

PRINTING APPARATUS AND SYSTEM CAPABLE OF JUDGING WHETHER PRINT RESULT IS SUCCESSFUL

BACKGROUND OF THE INVENTION

1. Field of the Invention

The present invention relates to a printing apparatus and a printing system including the printing apparatus, and more particularly, to a printing apparatus and a printing system including the printing apparatus that prints print contents acquired through satellite broadcasting, terrestrial broadcasting, cable broadcasting, the Internet, or the like.

2. Description of the Related Art

A printing apparatus is known that prints contents acquired by a digital television apparatus through digital broadcasting.

Japanese Patent Application Publication No. 2005-173757 discloses a printing system that addresses the issue of the user being able either to cancel payment in respect of failed print contents, or to reprint same, and the business entity that operates the system being able to reduce increased costs or lost time caused by support relating to the failure of print contents. In the printing system, print contents are printed together with identification information that identifies the print status, in such a manner that the success or failure of the printing of the print content is judged on the basis of the identification information.

Japanese Patent Application Publication No. 2005-150987 discloses a reception apparatus that, when controlling the printing of digital information, determines copy control information appended to the digital information, such as "copy permitted", "first-generation copy permitted", "recopy prohibited", "copy prohibited", and the like, and controls whether or not the digital information is printed in accordance with the determined copy control information. Japanese Patent Application Publication No. 2005-150987 also discloses that, when it is determined that printing has failed in the printing apparatus, the user performs an input operation requesting a reprint, and reprinting is carried out by the printing apparatus.

Japanese Patent Application Publication No. 2005-59248 discloses a method in which a printing apparatus forms an image on printing paper in accordance with received image data, the formed image is read in and sent to a publication management server as read image data, the publication management server judges the identicalness of the images in the image data sent to the printing apparatus and the read image data received from the printing apparatus, and if it is judged that they are not identical, then the printing apparatus performs invalidation of the printed image, for instance, by smearing the printed image.

In the above-described related arts, however, there is a problem in that frauds by the users with respect to paid-for print contents cannot be eliminated. Here, the frauds include an action of entering a correct print result, as a failed print result. More specifically, typical examples of the frauds include: the action of applying removable foreign matter to a correct print result and making the scanner apparatus read the result; the action of entering a print result by means of a scanner apparatus having writing on the platen; and the action of superimposing a transparent sheet having some print over the normal print result, and then making the scanner apparatus read the result.

In the method described in Japanese Patent Application Publication No. 2005-173757, the user inspects the print result after a paid-for print content has been printed, and if the user judges that the print has failed, then the user makes a scanner apparatus read the print result, this reading result is sent to the digital television apparatus, and the success or failure of printing is judged in the digital television apparatus. Hence, the user can commit the above-described fraud to enter a correct print result as a failed print into the scanner apparatus.

Japanese Patent Application Publication No. 2005-150987 makes no mention with respect to how to determine print failures in the printing apparatus. More specifically, it makes no mention of a composition that, when a density loss has occurred due to a nozzle ejection defect, is capable of determining a print failure of this kind, in accordance with the extent of density loss, even if this print failure can be perceived by the human user.

Furthermore, in the method described in Japanese Patent Application Publication No. 2005-59248, an image having been sent to a printing apparatus and a read image received from the printing apparatus are compared in a server, which is the transmission source of the print contents, in order to judge the presence or absence of a print failure. Therefore, there may be circumstances where it is difficult to judge the presence or absence of a print failure. More specifically, since the print quality is dependent on a combination of printing conditions in the printing apparatus, such as the type of ink, the type of print medium, the printing mode, and the like, then in order to compare the images accurately in the server, it is necessary for the server to deduce the printing conditions in the printing apparatus and the print quality, which is dependent on the printing conditions. However, in practice, it is difficult to deduce the print quality in this way, in the server. Moreover, the method described in Japanese Patent Application Publication No. 2005-59248 involves problems relating to the availability of the server. Namely, in order to carry out the image comparison in the server, a load is placed on the server even after transmission of the image, and the power supply of the server cannot be turned off until the printing and image reading has been completed in the printing apparatus, and the like.

SUMMARY OF THE INVENTION

The present invention has been contrived in view of the foregoing circumstances, an object thereof being to provide a printing apparatus and a printing system whereby the presence or absence of a print failure can be determined accurately, while preventing persons from being able to enter a correct print result as a failed print.

In order to attain the aforementioned object, the present invention is directed to a printing apparatus, comprising: a printing device which prints onto a prescribed print medium; a print result prediction device which predicts a print result on the print medium and accordingly outputs print result prediction data including image region print result prediction data for an image region and text region print result prediction data for a text region, the image region and the text region being recognized as an image and a text, respectively, by a person viewing a correct print result, the text region print result prediction data including a text code; an image reading device which optically reads in the print result on the print medium and accordingly outputs print result read data, the image reading device being disposed on a downstream side of a printing position of the print medium and on an upstream side of an output position of the print medium in a conveyance path along which the print medium is conveyed; and a print result judgment device which judges a printing failure on the print medium in accordance with the print result prediction data outputted from the print result prediction device and the print result read data outputted from the image reading device.

Here, an example of an image is a figure or a photograph, and an example of text is text characters, symbols, or the like. Decorative text character may be treated as an image.

According to this aspect of the present invention, the print result on the print medium is predicted in the printing apparatus, and furthermore, the print result on the print medium is read in before the print medium is outputted, by means of the image reading device disposed on the downstream side of the printing position of the print medium and on the upstream side of the output position of the print medium, in the conveyance path of the print medium, and the presence or absence of a print failure is judged on the basis of the print result prediction data and the print result read data. Therefore, it is possible to prevent mistaken determination of print failures caused by deceitful actions by the user. Moreover, since the presence or absence of a print failure is judged on the basis of the print result prediction data and the print result read data obtained by image reading, and since the print result read data reflects density losses, then it is possible to determine the presence or absence of print failures caused by ejection defects in nozzles. Furthermore, it is not necessary to judge the presence or absence of a print failure in the source provider of the print contents (for example, the broadcasting station or server).

Preferably, the print result judgment device subjects the print result read data of the image region corresponding to the image region print result prediction data to filtering process based on prescribed visual characteristics, and calculates a differential between the image region print result prediction data and the filtered print result read data of the image region; and the print result judgment device subjects the print result read data of the text region corresponding to the text region print result prediction data to text recognition, and judges whether the text code included in the text region print result prediction data coincides with a text code obtained by the text recognition.

According to this aspect of the present invention, the presence or absence of a print failure is judged on the basis of a data comparison that reflects human visual characteristics, in respect of the image region, and on the basis of whether or not the text codes are matching, in respect of the text region. Therefore, highly precise and highly flexible judgments can be made in accordance with human perception, and the presence or absence of a print failure can be determined accurately.

In order to attain the aforementioned object, the present invention is also directed to a printing system, comprising: a digital data reception device which receives digital data including print contents; and the above-described printing apparatus which acquires a print content from the digital data reception apparatus through one of cable communication, wireless communication and a storage medium, prints the print content, and judges a printing failure of the print content.

Preferably, the digital data reception device receives the digital data including the print contents through one of satellite broadcasting, terrestrial broadcasting, cable broadcasting and an electrical communication circuit.

According to the present invention, it is possible to accurately determine the presence or absence of a print failure, while preventing persons from being able to enter a correct print result as a failed print.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 9 is an illustrative diagram showing an embodiment of print quality data;

FIG. 12 is an illustrative diagram showing an embodiment of print result prediction data;

FIG. 22 is a principal plan diagram showing the disposition of the print unit and the image reading unit in the printing apparatus shown in FIG. 21.

DETAILED DESCRIPTION OF THE PREFERRED EMBODIMENTS

Figure 1:
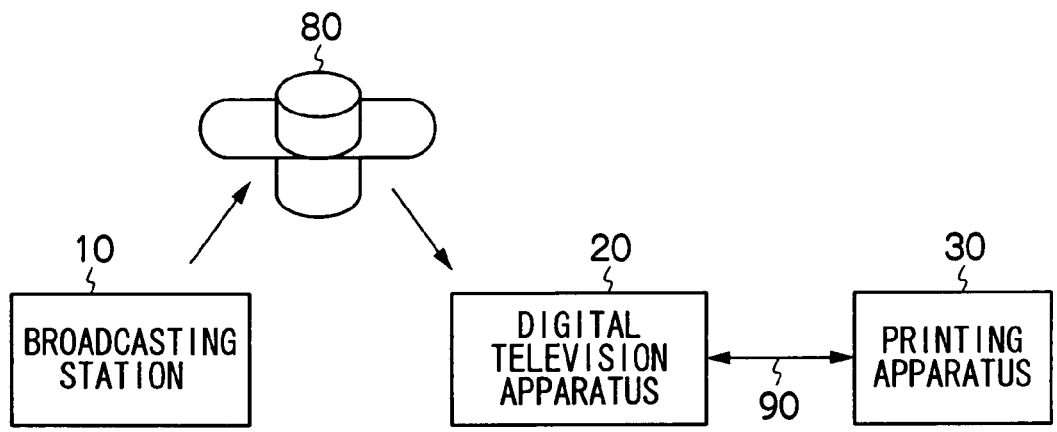
FIG. 1 is a general schematic drawing of an embodiment of a printing system in which a digital television apparatus and a printing apparatus are connected by an on-line system.

FIG. 1 is a block diagram showing the overall composition of a printing system according to an embodiment of the present invention, in which a digital television apparatus 20 and a printing apparatus 30 are linked by an on-line connection through a network 90. The digital television apparatus 20 and the printing apparatus 30 may be connected directly through a cable, or they may be connected through a wireless link.

In FIG. 1, the digital television apparatus 20 is able to receive digital broadcast data transmitted through a communication satellite 80 from a broadcasting station 10.

The digital television apparatus 20 may acquire the digital broadcast data from the broadcasting station 10, not only by the satellite broadcasting through the communication satellite 80, but also by means of terrestrial broadcasting or CATV (cable television system). It is also possible for the digital television apparatus 20 to acquire the digital broadcast data, on demand, by means of an electrical communication circuit that is capable of bidirectional communication, such as the Internet.

Moreover, the digital television apparatus 20 may also be connected through the Internet (not illustrated) to the broadcasting station 10, or a data center connected to the broadcasting station 10, or the like (hereinafter, referred generally to as a "transmitting station"), in such a manner that the digital television apparatus 20 can communicate data to the broadcasting station 10.

The digital broadcast data may include print contents. Possible formats that could be used for the print contents are: BML (Broadcast Markup Language), or a language equivalent to BML, but the format is not limited to these. A language equivalent to BML is, for example, XML (Extensible Markup Language), which is similar to BML. If print contents are sent by using BML, or a language equivalent to BML, as the transmission format, then the viewing contents and the print contents included in the digital broadcast data may be sent as the same data, or in a format where either of the viewing contents and the print contents several contents are incorporated into the other.

Figure 2:
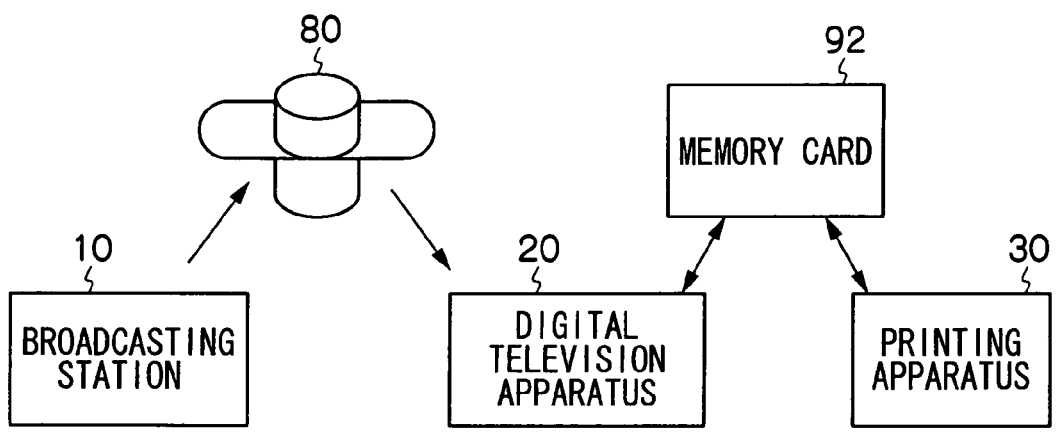
FIG. 2 is a general schematic drawing of an embodiment of a printing system in which a digital television apparatus and a printing apparatus are connected by an off-line system.

FIG. 2 shows a printing system based on a so-called off-line connection, in which the printing apparatus 30 and the digital television apparatus 20 communicate data, such as print contents, by means of a memory card 92. The digital television apparatus 20 and the printing apparatus 30 in FIG. 2 are each provided with memory card input and output units.

In the following explanation, a case is described in which the digital television apparatus 20 and the printing apparatus 30 communicate with each other through the network as shown in FIG. 1.

Figure 3:
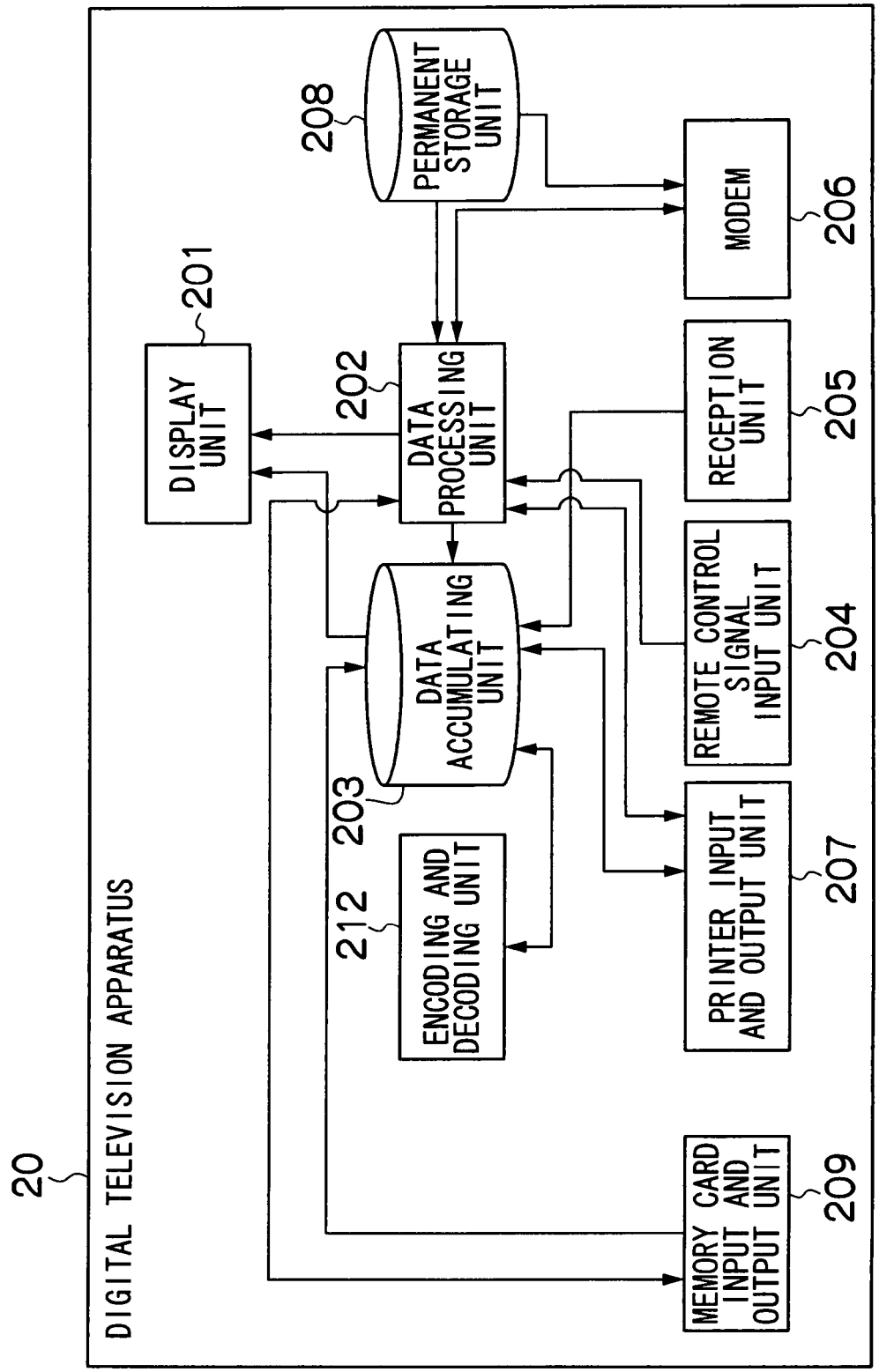
FIG. 3 is a block diagram showing the general composition of an embodiment of the digital television apparatus.

FIG. 3 is a block diagram showing the general composition of the digital television apparatus 20 according to the embodiment of the present invention.

In FIG. 3, the digital television apparatus 20 includes: a display unit 201, a data processing unit 202, a data accumulating unit 203, a remote control signal input unit 204, a reception unit 205, a modem 206, a printer input and output unit 207, a permanent data storage unit 208, a memory card input and output unit 209, and an encoding and decoding unit 212.

The digital broadcast data sent by the broadcasting station 10 in FIG. 1 is received by the reception unit 205. The contents included in the received digital broadcast data are accumulated in the data accumulating unit 203. Encoded contents are decoded by the encoding and decoding unit 212.

In normal data broadcasting, viewing contents are included in the digital broadcast data. The viewing contents accumulated in the data accumulating unit 203 are sent to the display unit 201 as picture data as and when appropriate in accordance with instructions from the data processing unit 202, and are then presented to the user.

The digital broadcast data contains print contents in addition to the viewing contents. It is envisaged that the print contents are sent by the same transmission method as the viewing contents, but the transmission method is not limited to the same.

The print contents are accumulated temporarily in the data accumulating unit 203, and are transmitted to the printing apparatus 30 through the printer input and output unit 207, as and when necessary. The print contents may be forwarded to the printing apparatus 30 from the memory card input and output unit 209, through the memory card. The print contents may also be transferred directly to the printing apparatus 30, rather than being accumulated in the data accumulating unit 203.

If the viewer presses a remote control key (not illustrated), then remote control information, which is the corresponding key information, is sent to the data processing unit 202 through the remote control signal input unit 204. When the remote control information is received, the data processing unit 202 performs suitable processing in accordance with the operational description stated in the viewing contents stored in the data accumulating unit 203, and according to circumstances, display control information is sent to the display unit 201. For example, if the remote control information is information relating to an arrow key of the remote control, which moves the highlight on the screen, then the data processing unit 202 accesses the viewing contents stored in the data accumulating unit 203, identifies the direction in which the highlight should be moved, and sends the display control information for moving the highlight, to the display unit 201.

If the data broadcast program is a program that requires bidirectional communication with the broadcasting station, then the data processing unit 202 issues modem control information to the modem 206, as well as instructing connection to the broadcasting station 10 and transmission and reception of data, and the like.

Furthermore, the digital television apparatus 20 also has, in addition to the data accumulating unit 203, the permanent data storage unit 208 forming a region for storing data. The permanent data storage unit 208 stores data that needs to be stored for a prescribed period of time, rather than temporary data.

The processing relating to the print contents is described in more detail below.

Figure 4:
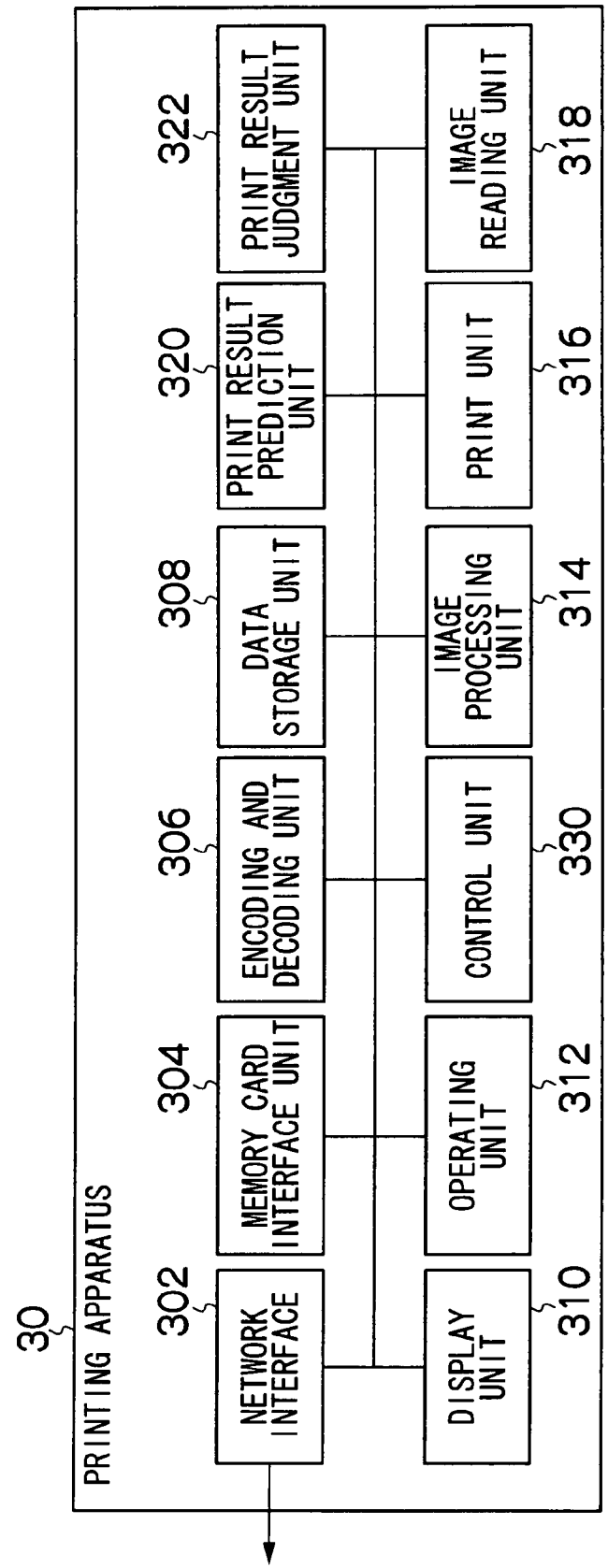
FIG. 4 is a block diagram showing the general composition of an embodiment of the printing apparatus.

FIG. 4 is a block diagram showing the composition of the printing apparatus 30 according to the embodiment of the present invention.

In FIG. 4, the printing apparatus 30 includes: a network interface 302, a memory card interface 304, an encoding and decoding unit 306, a data storage unit 308, a display unit 310, an operating unit 312, an image processing unit 314, a print unit 316, an image reading unit 318, a print result prediction unit 320, a print result judgment unit 322, and a control unit 330.

The network interface 302 is a device that communicates with the digital television apparatus 20 through the network. The network may be a cable-based network or a wireless network.

The memory card interface 304 is a device for reading out data or writing data to the memory card. The memory card may be formed in the shape of a card or a stick.

The printing apparatus 30 acquires various types of data, such as print contents, from the digital television apparatus 20, through the network or memory card. Furthermore, the printing apparatus 30 forwards various types of data to the digital television apparatus 20, through the network or memory card.

The encoding and decoding unit 306 performs encoding and decoding of the data. Encoding is based on a public key method or a common key method, or the like.

The data storage unit 308 is constituted, for example, by a RAM (Random Access Memory), an EEPROM (Electrically Erasable Programmable ROM), or the like, and serves to store data of various types.

The display unit 310 is constituted by a LCD (Liquid Crystal Display), for example, which performs a display function.

The operating unit 312 has buttons, for example, and receives input operations performed by the user.

The image processing unit 314 changes a print content acquired from the digital television apparatus 20 to data (print data) of a format that can be printed by the print unit 316.

In the present embodiment, the print unit 316 includes an ink droplet ejection head having nozzles, which eject droplets of ink, and it prints onto a print medium, such as paper.

The image reading unit 318 is constituted, for example, by CCDs (Charge Coupled Devices), and is disposed on the downstream side of the printing position of the print medium and on the upstream side of the output position of the print medium, in the conveyance path along which the print medium is conveyed. The image reading unit 318 reads out the print result on the print medium optically, and outputs the reading result as read image data (also called "print result read data").

The print result prediction unit 320 predicts the print result on the print medium and creates print result prediction data. The details of the print result prediction data are described below.

The print result judgment unit 322 judges the presence or absence of a print failure on the print medium, on the basis of the print result prediction data obtained by predicting the print result on the print medium by means of the print result prediction unit 320, and the read image data (print result read data) obtained by reading in the print result on the print medium by means of the image reading unit 318.

The control unit 330 controls the respective units of the printing apparatus 30 in accordance with a prescribed program.

The control unit 330, the encoding and decoding unit 306, the image processing unit 314, the print result prediction unit 320, and the print result judgment unit 322 can be constituted by a microcomputer.

Figure 5:
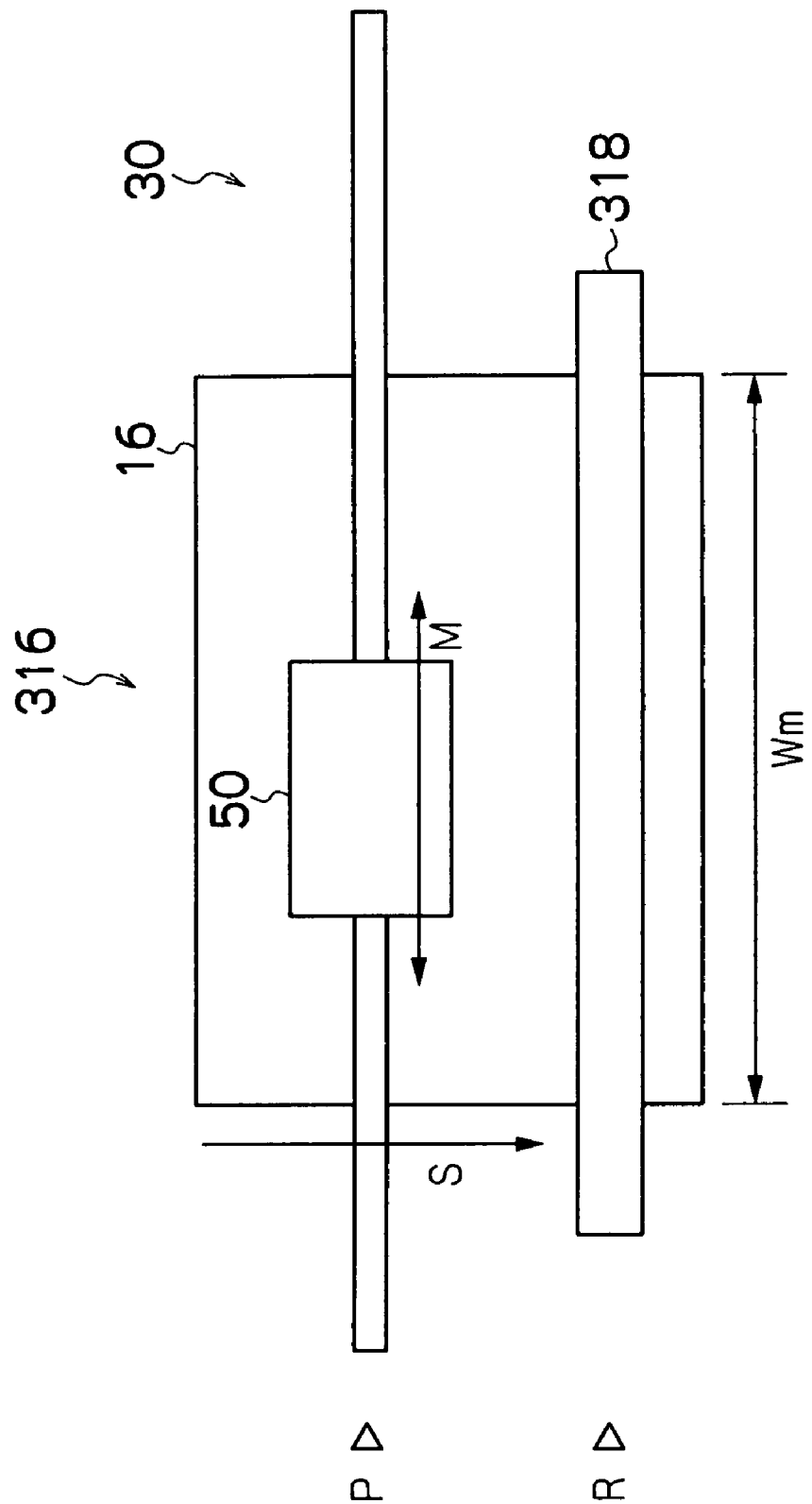
FIG. 5 is a principal plan diagram showing the disposition of a print unit and an image reading unit in the printing apparatus shown in FIG. 4.

FIG. 5 is a principal plan diagram showing the disposition of the print unit 316 and the image reading unit 318 in the printing apparatus 30 shown in FIG. 4.

The print unit 316 is constituted by a shuttle type ink droplet ejection head 50, which moves reciprocally in the direction indicated by an arrow M in FIG. 5 (the main scanning direction). This ink droplet ejection head 50 has a plurality of nozzles, which eject droplets of ink. The print medium 16 is conveyed in the direction indicated by an arrow S in FIG. 5 (the medium conveyance direction).

In the present embodiment, the image reading unit 318 is constituted by a line sensor having a reading width that is longer than the width Wm of the print medium 16. The image reading unit 318 is disposed in a reading position R, which is on the downstream side of the print position P of the print medium 16 and on the upstream side of the output position E of the print medium 16, in terms of the medium conveyance direction S. Furthermore, the ink droplet ejection head 50 and the image reading unit 318 are accommodated inside the casing of the printing apparatus 30.

Hence, fraudulent actions such as attaching foreign matter to the print medium 16 are prevented after an image has been formed on the print medium 16 by the ink droplet ejection head 50, until the print result on the print medium 16 has been read by the image reading unit 318 and then outputted.

Figure 6:
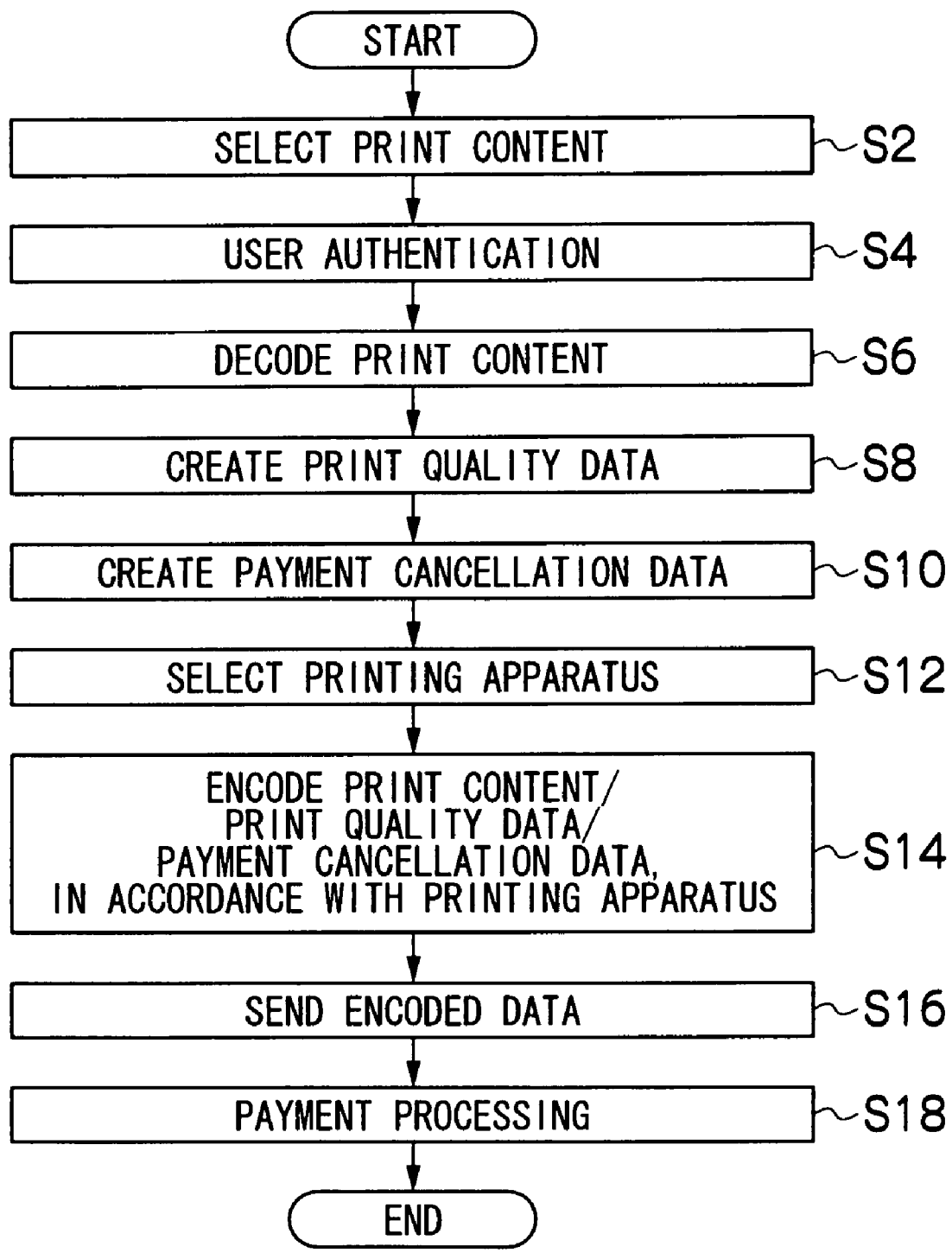
FIG. 6 is a first flowchart showing the sequence of an embodiment of a printing process.
Figure 7:
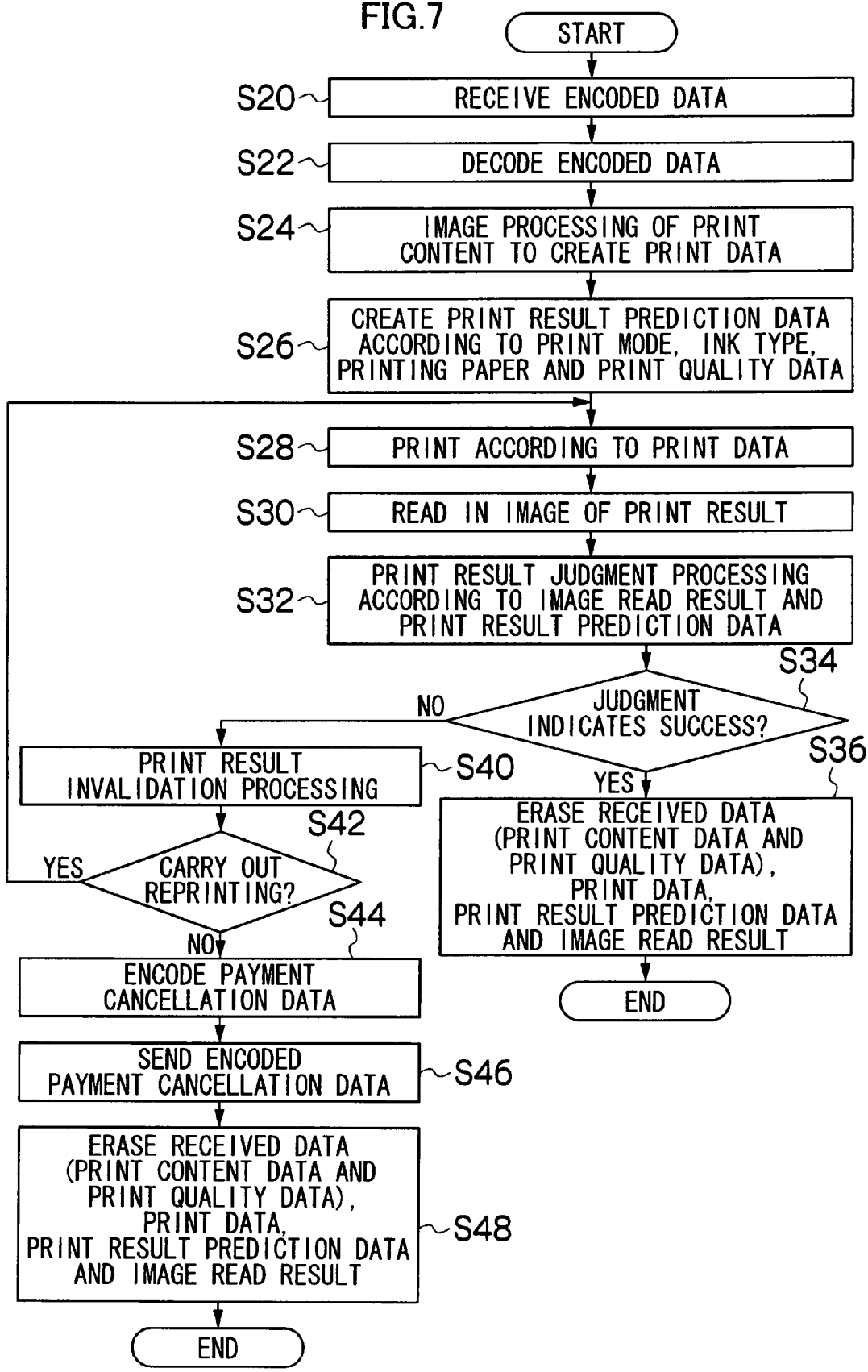
FIG. 7 is a second flowchart showing the sequence of the embodiment of the printing process.
Figure 8:
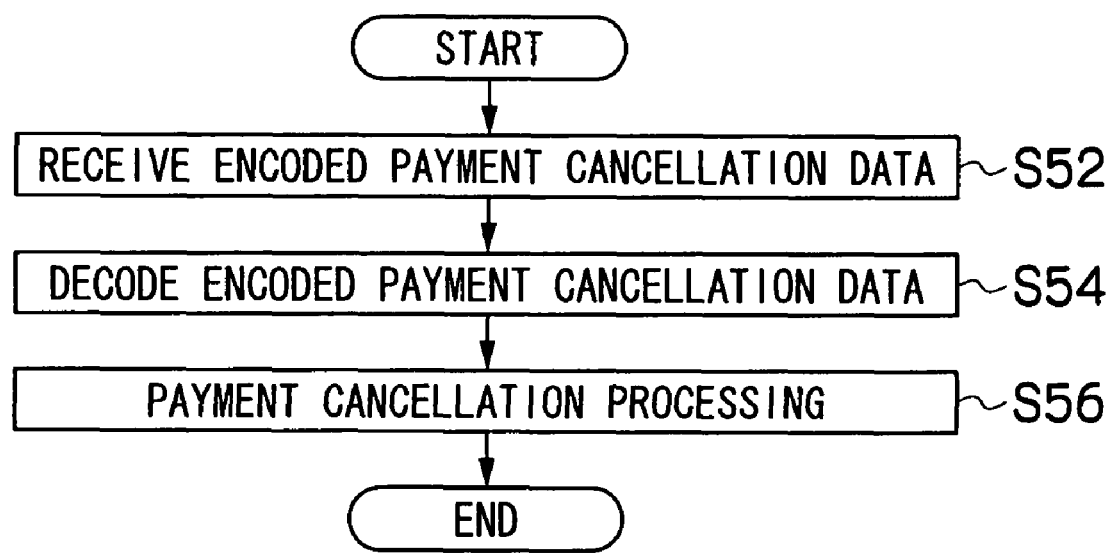
FIG. 8 is a third flowchart showing the sequence of the embodiment of the printing process.

FIGS. 6, 7 and 8 are flowcharts showing the sequence of a printing process in the printing system shown in FIG. 1. The description below follows the flowcharts shown in FIGS. 6, 7 and 8.

If the user performs an operation for selecting a print content that the user wishes to print, by using the remote control unit of the digital television apparatus 20 in FIG. 3, then a print content selection instruction is inputted to the remote control signal input unit 204 of the digital television apparatus 20 in FIG. 3 (step S2 in FIG. 6). In the present embodiment, the print content selected is a print content contained in digital broadcast data sent in an encoded form, which has been accumulated in the data accumulating unit 203 of the digital television apparatus 20. If the print content is subject to a charge (paid-for content), then the digital television apparatus 20 carries out user authentication in order to effect payment (step S4 in FIG. 6). If user authentication is successfully completed, then the digital television apparatus 20 decodes the selected print content (step S6 in FIG. 6).

Here, the print content is constituted by image data for printing, which includes image data of at least one of: image data of a region that is perceived to be an image, such as a diagram or photograph (hereinafter, called "image region") when a correct print result is observed by the human user, and image data of a region that is perceived to be text information (text), such as text characters or symbols, (hereinafter, called "text region") when the print result is observed by the human user. In the present embodiment, a region corresponding to decorative text information (for example, a company logo) is treated as an image region.

Figure 18:
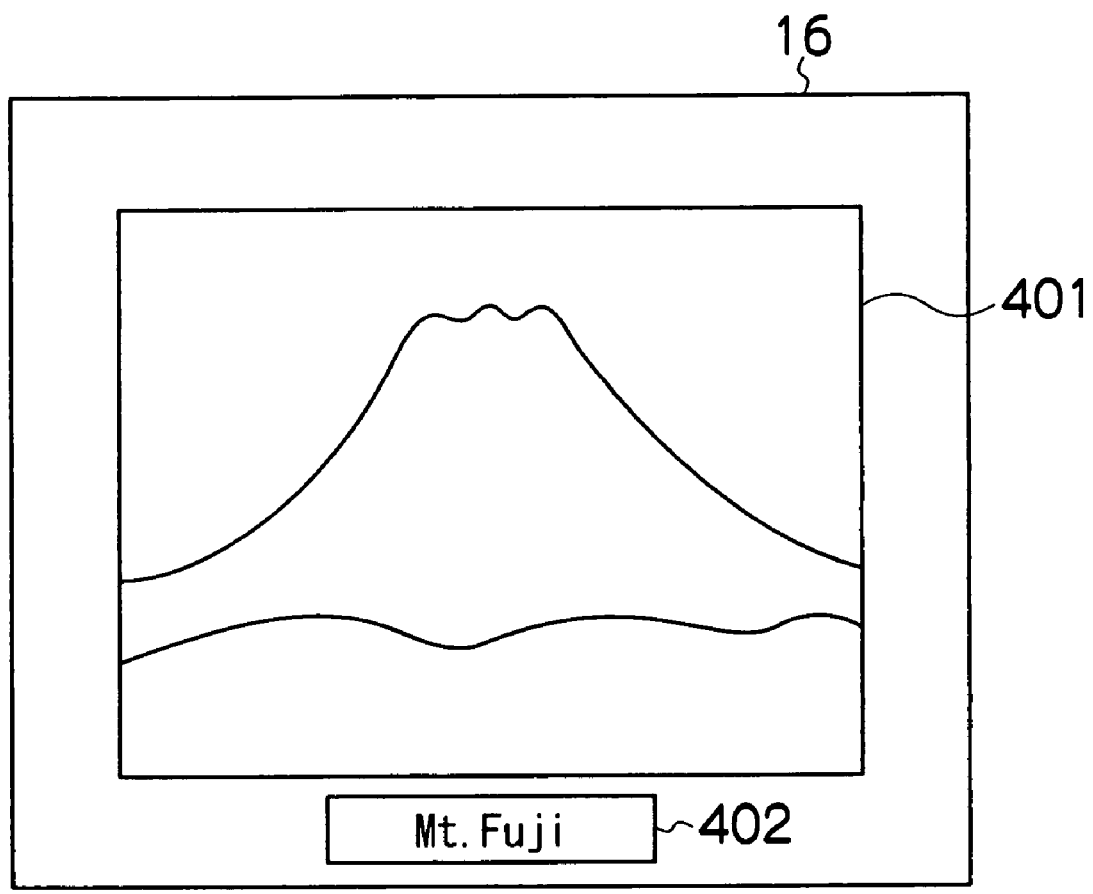
FIG. 18 is an illustrative diagram for describing an image region and a text region.

In order to aid understanding of the present invention, a case is described in which both the image data of an image region and the image data of a text region are contained in the print content. FIG. 18 shows an example of a print content, which has been printed onto a print medium 16 by the printing apparatus 30 by means of the steps described below. In the example shown in FIG. 18, a region 401 corresponding to a photographic image on the print medium 16 is the image region and a region 402 corresponding to text information on the print medium 16 is the text region.

The digital television apparatus 20 creates print quality data for guaranteeing the printing of print contents (step S8 in FIG. 6).

FIG. 9 shows a concrete embodiment of print quality data. In FIG. 9, the print quality data 410 includes: region information 411 for mutually separating the image region and the text region; resolution information 412 used to judge the quality of the image region (hereinafter, called the "image region judgment resolution"); resolution information 413 used to judge the quality of the text region (hereinafter, called the "text region judgment resolution"); and commonly known visual filter characteristics information 414 used to judge the quality of the image region (hereinafter, called "judgment visual filter characteristics"). The print quality data 410 further includes, as image region data 415 used to judge the quality of the image region: image data 416 (hereinafter, called "image data of judgment resolution") corresponding to the image data of the image region of the print content and having the resolution indicated by the image region judgment resolution 412; and threshold value data 417 (hereinafter, called "threshold value image data of judgment resolution") including an arrangement of threshold values corresponding to the arrangement of pixels in the image data of judgment resolution 416. The print quality data 410 further includes, as text region data 418 used to judge the quality of the text region, a text string 419 composed of a code sequence that indicates the contents of the text region of the print content.

The region information 411 is used to extract and mutually separate the read image data of the image region and the read image data of the text region, in the read image data obtained by reading in the print result in the printing apparatus 30 (in other words, the image printed onto the print medium 16).

The image region judgment resolution 412 and the text region judgment resolution 413 can be set to a different resolution from the image reading resolution, and furthermore, the image region judgment resolution 412 and the text region judgment resolution 413 may also be set to resolutions different to each other The judgment visual filter characteristics 414 are not limited strictly to a visual characteristics filter, and they may also be based on a spatial filter for low-pass characteristics.

The image data 416 of judgment resolution is obtained by taking the image data of the image region in the print content, which is perceived as an image by a person observing a correct print result, and converting it into image data having the resolution indicated by the image region judgment resolution 412. In the example shown in FIG. 18, the image data corresponding to the region 401 of the photographic image in the print content is converted into image data having the resolution indicated by the image region judgment resolution 412.

The judgment threshold value image data 417 of the judgment resolution serves to manage variations in the tolerable image quality, depending on the colors and image contents of the image represented by the image data of the image region in the print content. For example, it makes it possible to handle cases where, for instance, stricter quality standards are required in a portion of an image region corresponding to a human face, than in the other portions of the image region, or cases where stricter color management is required in a portion corresponding to a company logo, than in the other portions. In an image portion where stricter quality standards apply, or where stricter color management is required, the threshold value is set to a lower value than in the other portions.

The text string 419 in the text region data 418 corresponds to the image data of the text region that is perceived as text information in the print content when a person observes a correct print result, and it is created by encoding the contents represented by the image data in the text region. In the example in FIG. 18, the text "Mt. Fuji" is obtained as the text string 419 of the text image data 418, by text character recognition on the basis of the image data corresponding to the text region 402 on the outside of the region 401 of the photographic image.

In the present embodiment, the print quality data 410 is created on the basis of the print content accumulated in the data accumulating unit 203 of the digital television apparatus 20, namely, on the basis of the print content contained in the digital broadcast data transmitted from the broadcasting station 10 in FIG. 1, which is the print content decoded by the digital television apparatus 20. Alternatively, the print quality data 410 is created on the basis of both the print content, and the data accumulated in the data accumulating unit 203 of the digital television apparatus 20 in association with the print content, which data relates to the quality of the print content (content quality data). Moreover, if the print quality data is accumulated in the data accumulating unit 203 of the digital television apparatus 20 in association with the print content, then the print quality data 410 is acquired from the data accumulating unit 203 of the digital television apparatus 20, instead of creating the print quality data 410.

Furthermore, all of the print quality data 410 is not necessarily created by the digital television apparatus 20, and it is possible for all or a portion of the print quality data 410 to be created in the broadcasting station 10.

Next, the digital television apparatus 20 creates payment cancellation data (step S10 in FIG. 6). The payment cancellation data includes information indicating whether or not payment for the print content is to be cancelled in the event of a printing failure in the printing apparatus 30.

Figure 10:
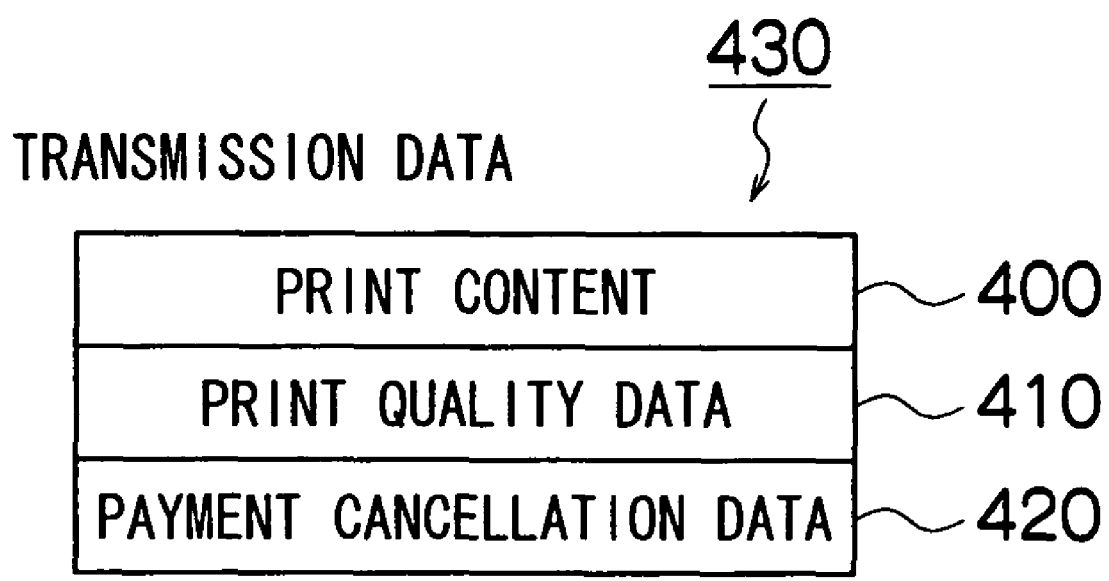
FIG. 10 is an illustrative diagram showing an embodiment of transmission data.

When the printing apparatus 30 that is to print the print content has been selected (step S12 in FIG. 6), then the transmission data 430, of which an embodiment in shown in FIG. 10, is encoded using the unique encoding key of the selected printing apparatus 30 (in the case of the public key system, the public key of the printing apparatus 30) (step S14 in FIG. 6). The transmission data 430 in FIG. 10 is constituted by the print content 400, the print quality data 410 and the payment cancellation data 420. The encoded transmission data 430 (encoded data) is sent to the printing apparatus 30 through the network (step S16 in FIG. 6).

It is also possible that the encoded data is stored temporarily in a storage medium, such as a memory card, and then transferred to the printing apparatus 30 through the storage medium.

Prescribed payment processing is then carried out (step S18 in FIG. 6) and tasks relating to the print content in the digital television apparatus 20 are thereby completed. The payment cancellation processing carried out in the digital television apparatus 20 in the event of a print failure is described hereinafter.

The encoded data is received by the network interface 302 of the printing apparatus 30 (step S20 in FIG. 7), and then decoded by the encoding and decoding unit 306 of the printing apparatus 30 (step S22 in FIG. 7). Consequently, the decoded print content 400, print quality data 410 and payment cancellation data 420 are obtained. Rather than decoding the payment cancellation data 420 when it is received, it is also possible to decode the payment cancellation data 420 when there has been a print failure and reprinting has not been selected.

Information indicating the details of the print content are displayed on the display unit 310 of the printing apparatus 30, and therefore the user is able to enter a selection instruction and a print execution instruction by operating the operating unit 312 (for example, the buttons) of the printing apparatus 30.

In the case where the printing is carried out through the network as in the present embodiment, if the printing apparatus 30 has already completed preparations for printing when the encoded data is received, then it is possible that the print operation is executed without the user performing the operation at the operating unit 312 of the printing apparatus 30.

Next, the image processing unit 314 of the printing apparatus 30 carries out print data creation processing (step S24 in FIG. 7).

In the present embodiment, the print unit 316 of the printing apparatus 30 is constituted by the ink droplet ejection head having the nozzles ejecting droplets of ink, and the print data (namely, the image data used directly for printing) is created in the form of dot pattern data for the ejection of ink droplets. The dot pattern data indicates, for example, the presence or absence of droplet ejection and the droplet ejection volume, for each nozzle. It is also possible to use dot pattern data that only indicates the presence or absence of droplet ejection, for each nozzle.

Figure 11:
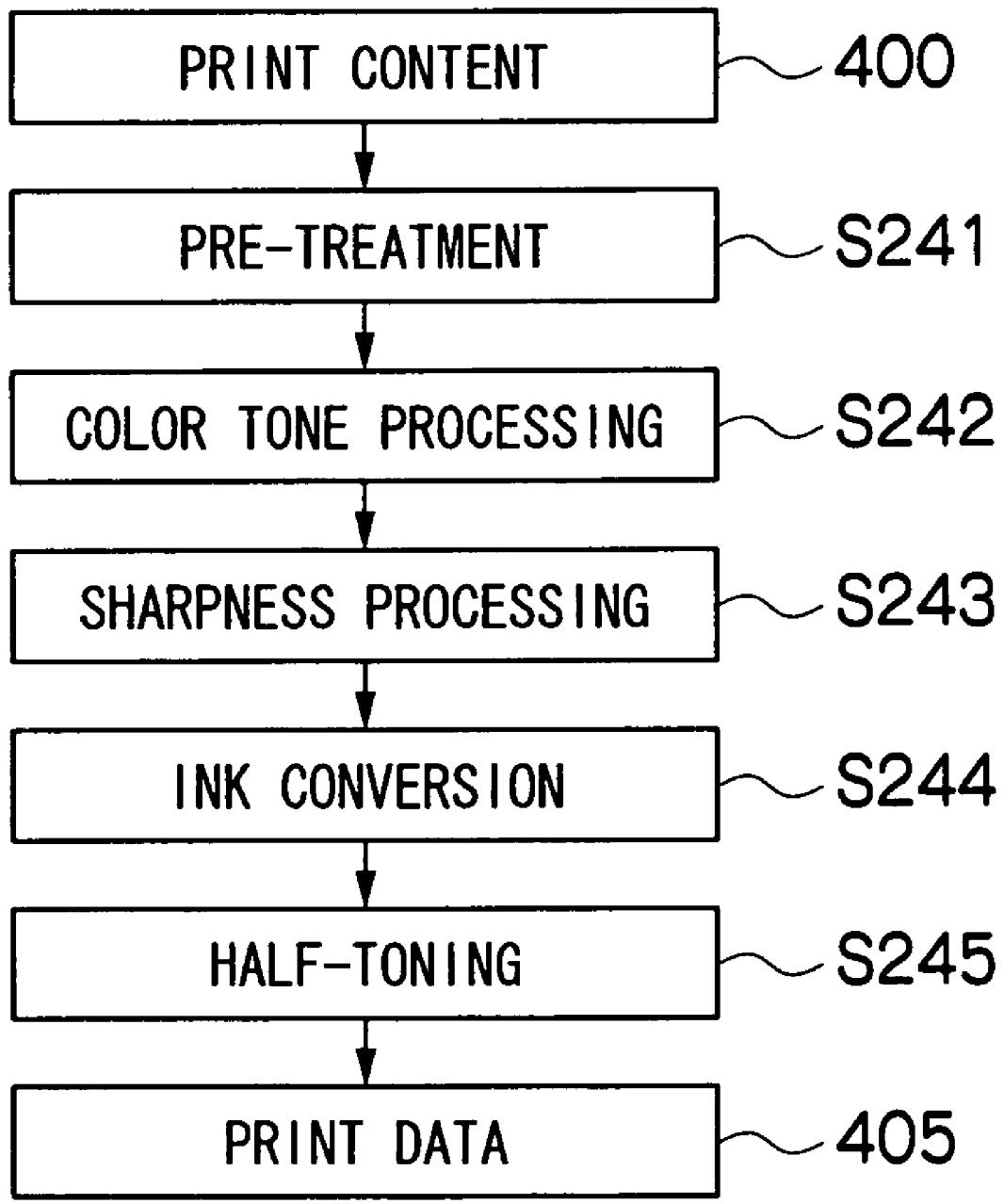
FIG. 11 is a flowchart showing the sequence of an embodiment of a print data creation process.

The operational sequence of an embodiment of the print data creation process is shown in the flowchart in FIG. 11.

In the print data creation process shown in FIG. 11, print data 405 is created by successively subjecting the print content to: commonly known pre-processing (step S241); commonly known color tone processing (step S242), commonly known sharpness processing (step S243); commonly known ink conversion processing (step S244); and commonly known half-toning processing (step S245).

If the print content is, for example, constituted by image data including an arrangement of original pixels having tonal density values for respective colors of red (R), green (G) and blue (B) (hereinafter, called "RGB image data"), then in the ink conversion processing (step S244), the RGB data is converted into image data including an arrangement of pixels having tonal density values for respective ink colors of cyan (C), magenta (M), yellow (Y) and black (K), for example (hereinafter, called "CMYK image data"), and it is further converted into image data indicating the ink droplet ejection volumes for the respective unit surface areas of the print medium 16 (hereinafter, called "ink droplet ejection image data"). Furthermore, in the halftoning process (step S245), halftoning is carried out using a prescribed threshold value matrix in such a manner that a continuous tonal graduation is created in the eyes of a human observer. By this means, the print data is generated in the form of pseudo-tonal image data corresponding to a dot pattern on the print medium (dot pattern data).

Thereupon, the print result prediction unit 320 of the printing apparatus 30 creates the print result prediction data on the basis of the print quality data 410 shown in FIG. 9 and the print condition information for the printing apparatus 30, which indicates the ink type (photo use, business use, or the like), the print medium type (photographic paper, normal paper, glossy paper, or the like), and the print mode (speed priority mode, maximum quality mode or text mode) (step S26 in FIG. 7).

FIG. 12 shows an embodiment of print result prediction data. The print result prediction data 440 shown in FIG. 12 contains "judgment image data" 442 and "judgment threshold value image data" 443, as image region data 441 to be used in judging the quality of the image region. Furthermore, the text string 419 of the text region data 418 in the print quality data 410 shown in FIG. 9 is used as text region data 444 for use in judging the quality of the text region.

The judgment image data 442 is image data which indicates the prediction result of the printed colors (the colors as reproduced by printing) of the image region on the print medium 16.

The judgment threshold value image data 443 is threshold value data that indicates the accuracy of the printed colors of the image region on the print medium 16, and it includes an arrangement of threshold values which correspond to the arrangement of pixels in the judgment image data 442.

In other words, since the various parameters used for predicting the print result (hereinafter called "print result prediction parameters") are beforehand stored in the data storage unit 308 of the printing apparatus 30, then the judgment image data 442 and the judgment threshold value image data 443 are created on the basis of the print quality data 410 shown in FIG. 9, and the print result prediction parameters corresponding to the printing conditions of the printing apparatus 30, which are selected from the print result prediction parameters stored in the data storage unit 308.

Figure 13:
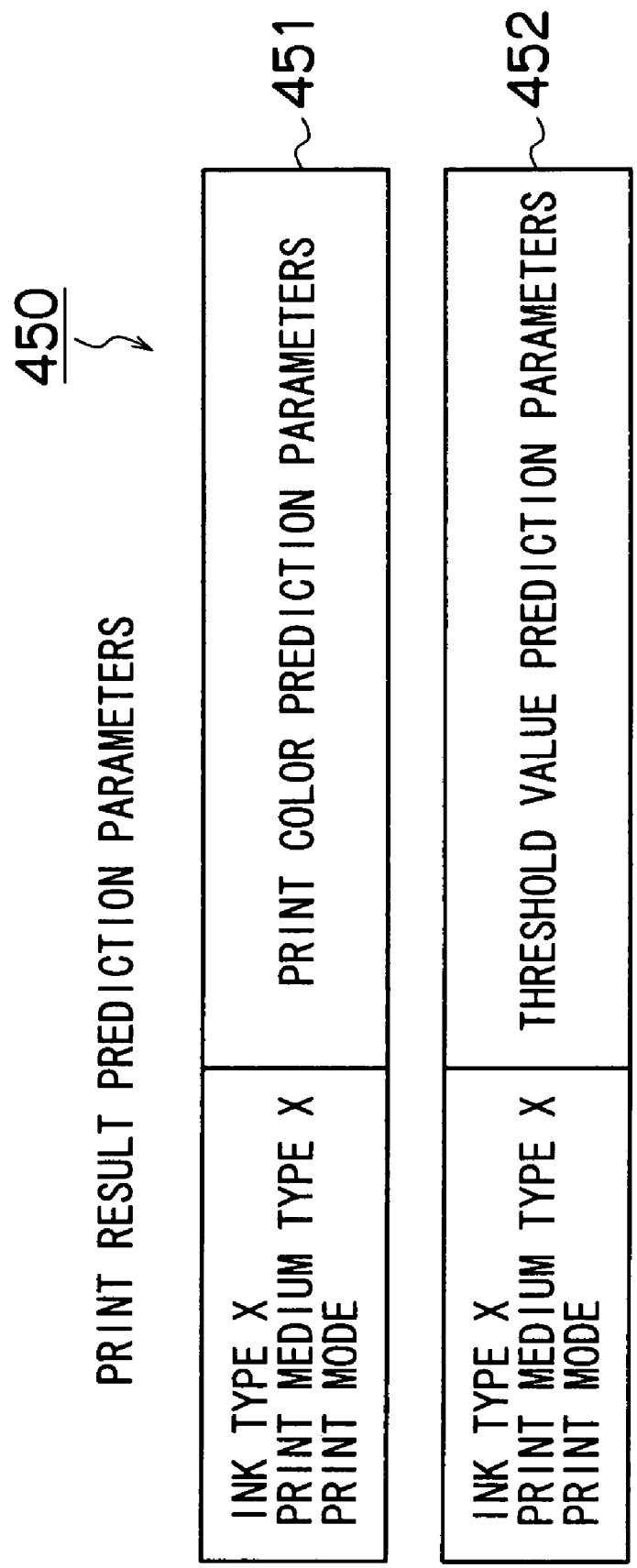
FIG. 13 is an illustrative diagram showing an embodiment of selected print result prediction parameters.

FIG. 13 shows an embodiment of print result prediction parameters 450 selected in accordance with a combination of the ink type, the print medium type and the print mode.

In FIG. 13, the print result prediction parameters 450 include print color prediction parameters 451 and threshold value prediction parameters 452.

The print color prediction parameters 451 are parameters used to predict the reproduced colors in the image region of the print medium 16. In other words, the print color prediction parameters 451 are used to create the judgment image data 442 of the image region data 441 in the print result prediction data 440 shown in FIG. 12. In the present embodiment, as described below, these parameters are used when creating the judgment image data 442 on the basis of the ink droplet ejection image data or image data corresponding to same. The judgment image data 442 is not limited to being created on the basis of the ink droplet ejection image data, and it may also be created on the basis of the above-described dot pattern data, CMYK image data, or RGB image data, or image data corresponding to these. In other words, the print color prediction parameters 451 are parameters for creating judgment image data 442 from the image data relating to the image region of the print content.

The print color prediction parameters 451 may be: commonly known image processing parameters used for so-called color conversion processing, or commonly known image processing parameters used for so-called color matching, or image processing parameters similar to these. More specifically, possible embodiments of these parameters are in: a LUT (look-up table), a matrix (3×3, 3×10, etc.), or a 3D-LUT (three-dimensional look-up table).

Figure 19A:
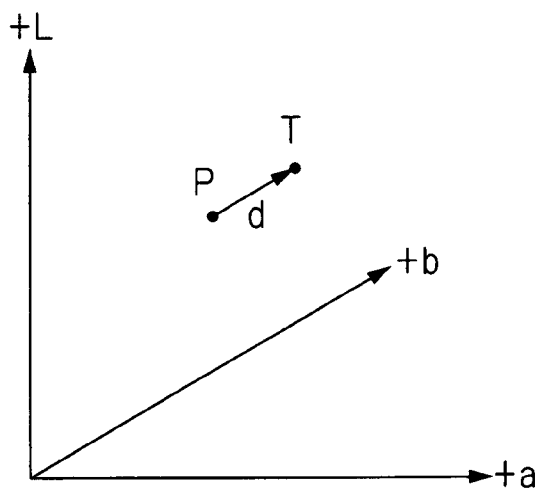
FIGS. 19A to 19C are illustrative diagrams for explaining threshold value prediction parameters.
Figure 19B:
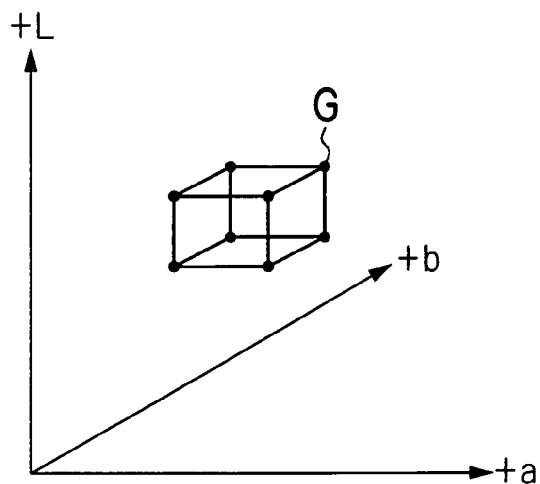
Figure 19C:
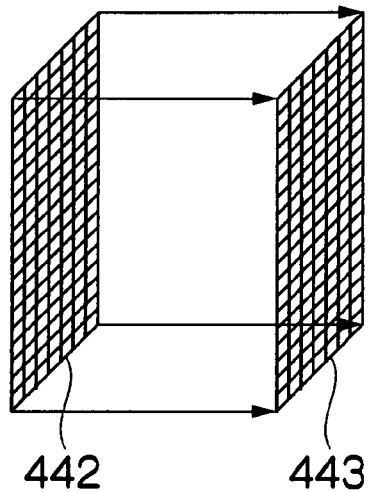

The threshold value prediction parameters 452 are parameters used to predict the accuracy of the reproduced colors on the print medium 16. In general, the printing apparatus 30 is not able to reproduce all colors on the print medium 16 with the same degree of accuracy, and differences occur in the accuracy of the reproduced color, as actually reproduced on the print medium 16, in accordance with differences in the target color that it is wished to reproduce on the print medium 16. Here, a tolerable range of error with respect to the target color (namely, the range of colors that can be reproduced stably in the printing apparatus 30 with respect to the target color) is determined as a threshold value for each of the target colors that it is wished to reproduce on the print medium 16. More specifically, as shown in FIG. 19A, in a prescribed color coordinates system, such as an L*a*b* (L-star, a-star, b-star) color coordinates system, the color coordinates P of each target color are examined successively, and the range (tolerable error range) of the distance d between the color coordinates P of the target color and the color coordinates T of a color that is tolerable with respect to the target color is determined and set as the threshold value for the color coordinates P. In practice, the color coordinates system is divided up appropriately, and a threshold value is determined only in respect of a lattice point G as shown in FIG. 19B, while threshold values are calculated for the other color coordinates by volumetric imputation. In this way, a table of threshold values is obtained for the whole color coordinates system, and this table is stored in advance in the data storage unit 308 of the printing apparatus 30, as the threshold value prediction parameters 452. When printing, the threshold value prediction parameters 452 are used to generate judgment threshold value image data 443 corresponding to the image region of the print result, from the judgment image data 442 corresponding to the image region of the print result, as shown in FIG. 19C. In other words, in the case of the image region of the print result, threshold values indicating the tolerable error ranges with respect to the target colors are extracted from the threshold value prediction parameters 452 for the respective target colors indicated by the judgment image data 442, and judgment threshold value image data 443 is constituted by arranging these threshold values to cover the whole of the image region.

Figure 14:
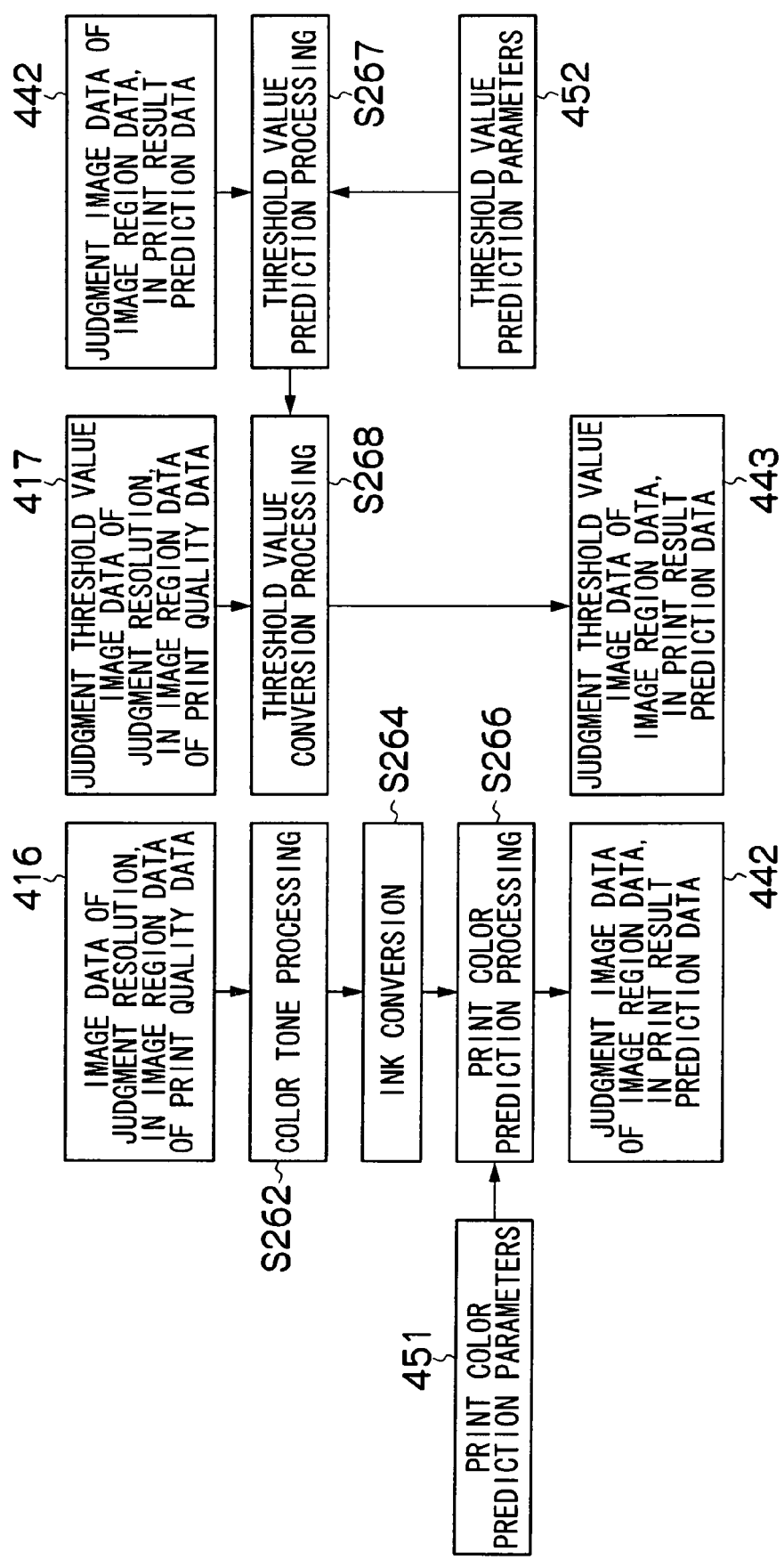
FIG. 14 is a flowchart showing the sequence of an embodiment of a print result prediction data creation process.

FIG. 14 is a flowchart showing an embodiment of the print result prediction data creation process (step S26 in FIG. 7). Here, the operational sequence on the left-hand side in FIG. 14 indicates a process for creating the judgment image data 442 of the image region data 441, as part of the print result prediction data 440. The operational sequence on the right-hand side in FIG. 14 indicates a process for creating the judgment threshold value image data 423 of the image region data 441, as part of the print result prediction data 440.

In the operational sequence on the left-hand side of FIG. 14, firstly, color tone conversion processing (step S262) and ink conversion processing (step S264) are carried out on the image data 416 of judgment resolution (the first image data for print quality judgment), in the image region data 415 of the print quality data 410 shown in FIG. 9. These are substantially the same processes as the color tone conversion processing (step S242 in FIG. 11) and the ink conversion processing (step S244 in FIG. 11) of the print data creation process, but they may reflect some differences in resolution. Thereupon, the color (printed color) reproduced by printing onto the print medium 16 is predicted on the basis of the print color prediction parameters 451 in FIG. 13, and this prediction result is obtained in the form of the judgment image data 442 (second image data for print quality judgment) of the image region data 441 in the print result prediction data 440 in FIG. 12 (step S266). In the present embodiment, the judgment image data 442 in a particular color coordinates system (for example, the L*a*b* color system) is created on the basis of the ink droplet ejection image data generated by the ink conversion process (step S264).

In summary, in the sequence on the left-hand side of FIG. 14, the first image data for print quality judgment (namely, the image data 416 of judgment resolution in the image region data 415 of the print quality data 410 in FIG. 9), which is created by the digital television apparatus 20, is converted into the second image data for print quality judgment (namely, the judgment image data 442 of the image region data 441 in the print result prediction data 440 in FIG. 12), on the basis of the printing conditions of the respective printing apparatus 30 (in the present embodiment, the ink type, the print medium type and the print mode).

In the sequence on the right-hand side of FIG. 14, firstly, a threshold value indicating the accuracy of the color (printed color) of the image actually formed on the print medium is predicted, on the basis of the threshold value prediction parameters 452 in FIG. 13 and the judgment image data 442 of the image region data 441 in the print result prediction data 440 shown in FIG. 12, and this prediction result is obtained in the form of the judgment threshold value image data 443 of the image region data 441 in the print result prediction data 440 shown in FIG. 12 (step S267 in FIG. 14).

In summary, the tolerable error range with respect to the target color that is to be reproduced on the print medium 16 (the range within which the target color can be reproduced stably) is determined in the form of a threshold value. In the present embodiment, the maximum value of the distance between the coordinates of the target color and the coordinates of the tolerable color, in a particular color coordinates system (for example, the L*a*b* color coordinates system), is specified as the threshold value. More specifically, the threshold value is determined by inputting color coordinates.

Figure 20:
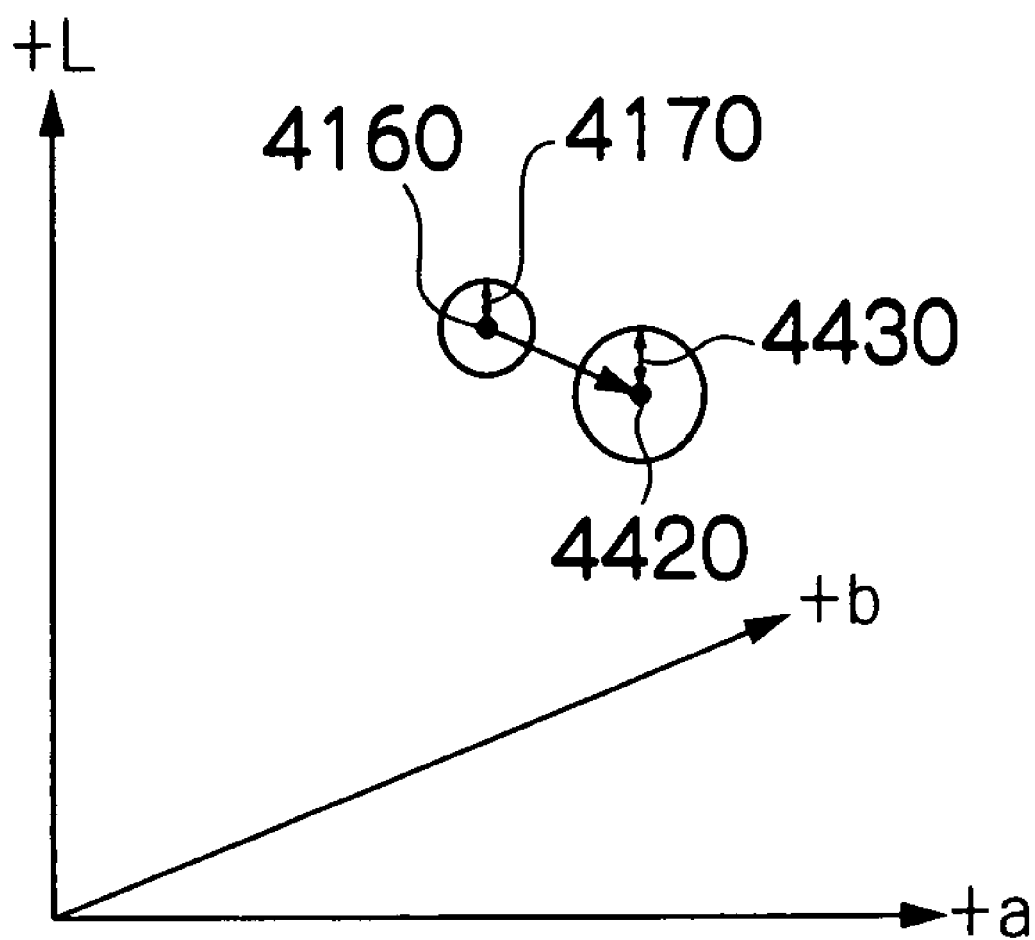
FIG. 20 is an illustrative diagram of a particular color coordinates system which depicts the relationship between a target color and threshold value designated by the digital television apparatus and a target color and threshold value determined in the printing apparatus.

FIG. 20 shows a particular color coordinates system (for example, the L*a*b* color coordinates system), which shows the relationship between: a target color 4160 designated by the digital television apparatus 20 (which is indicated by the image data 416 of judgment resolution in the image region data 415 of the print quality data 410 in FIG. 9); a threshold value 4170 designated by the digital television apparatus 20 (which is indicated by the judgment threshold value image data 417 of judgment resolution in the image region data 415 of the print quality data 410 in FIG. 9); a target color 4420 as determined by the print color prediction processing in the printing apparatus 30 (step S266 in FIG. 14) (which is indicated by the judgment image data 442 of the image region data 441 in the print result prediction data 440 in FIG. 12); and a threshold value 4430 determined by the threshold value prediction processing in the printing apparatus 30 (step S267 in FIG. 14).

Thereupon, for each pixel of the judgment image data 442 covering the image region of the print result, the threshold value (4430 in FIG. 20) determined by the threshold value prediction processing (step S267 in FIG. 14) is compared with the threshold value (4170 in FIG. 20) designated by the digital television apparatus 20, and the larger of these two threshold values is selected (step S268 in FIG. 14). The judgment threshold value image data 443 of the image region data 441 in the print result judgment data 440 in FIG. 12 is modified accordingly.

It is also possible to output a display indicating that the characteristics of the printing apparatus 30 are not appropriate for printing the print content, on the display unit 310 of the printing apparatus 30, depending on the size and distribution of the threshold values that have been modified as a result of the threshold value modification processing (step S268 in FIG. 14). Alternatively, a display indicating that the printing conditions in the printing apparatus 30, such as the ink type, the print medium type and the print mode, are not appropriate may also be outputted on the display unit 310 of the printing apparatus 30, thereby prompting modification of the printing conditions in the printing apparatus 30. It is also possible to select cancellation of printing, in which case the same processing (steps S40 to S48 in FIG. 7) is carried out as in a case where reprinting is not to be executed, as described below.

When the print result prediction data 440 in FIG. 12 has been created, the printing unit 316 of the printing apparatus 30 then carries out printing on the basis of the print data created at step S24 (step S28 in FIG. 7).

Figure 15:
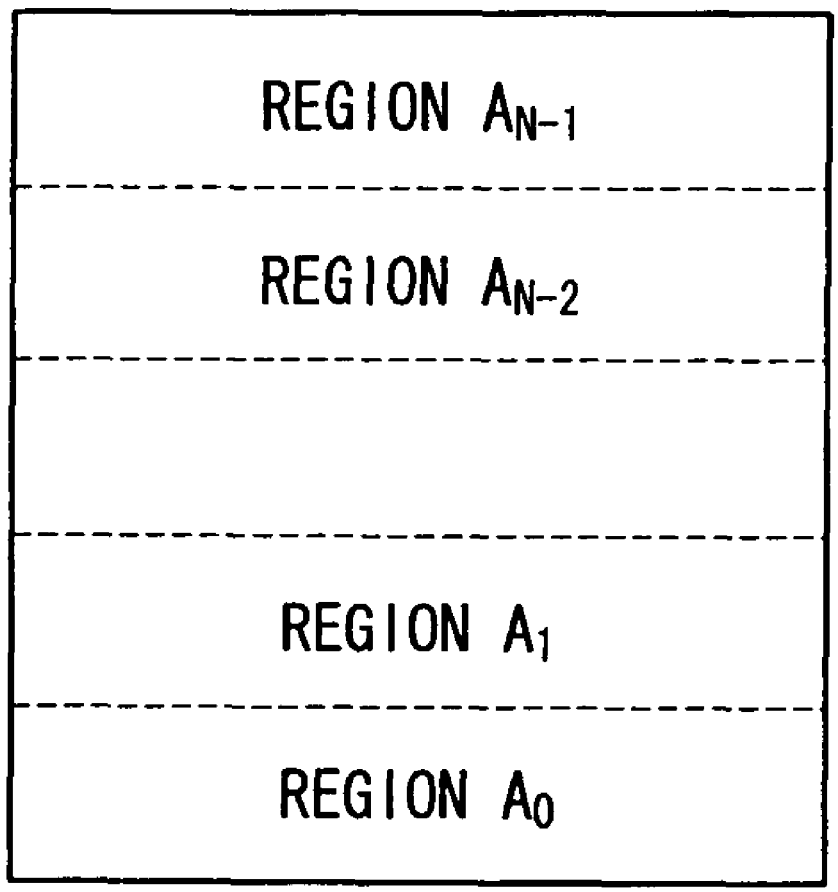
FIG. 15 is an illustrative diagram for describing the sequence of print result judgment.

For example, in the printing apparatus 30 based on the shuttle system as shown in FIG. 5, an image is printed successively, in parts, onto the print medium 16, by means of main scanning with the ink droplet ejection head 50 (scanning in the direction indicated by the arrow M in FIG. 5), conveyance of the medium (conveyance in the direction indicated by the arrow S in FIG. 5), and droplet ejection from the ink droplet ejection head 50. The image reading unit 318 provided on the paper conveyance path of the printing apparatus 30 carries out image reading (step S30 in FIG. 7) and print result judgment processing (step S32 in FIG. 7) for each of prescribed regions ($A_0, A_1, \ldots, A_{N-1}$) obtained by dividing up the area of the print medium 16 as shown in FIG. 15. In other words, the image reading and the print result judgment processing are carried out for each of the print regions ($A_0, A_1, \ldots, A_{N-1}$), until printing of the whole image has completed.

In the print result judgment processing (step S32 in FIG. 7), the presence or absence of a printing failure is judged on the basis of the print result prediction data 440 obtained by the print result prediction data creation process in step S26 in FIG. 7, and the read image data (print result read data) obtained by the image reading process in step S30 in FIG. 7.

Figure 16:
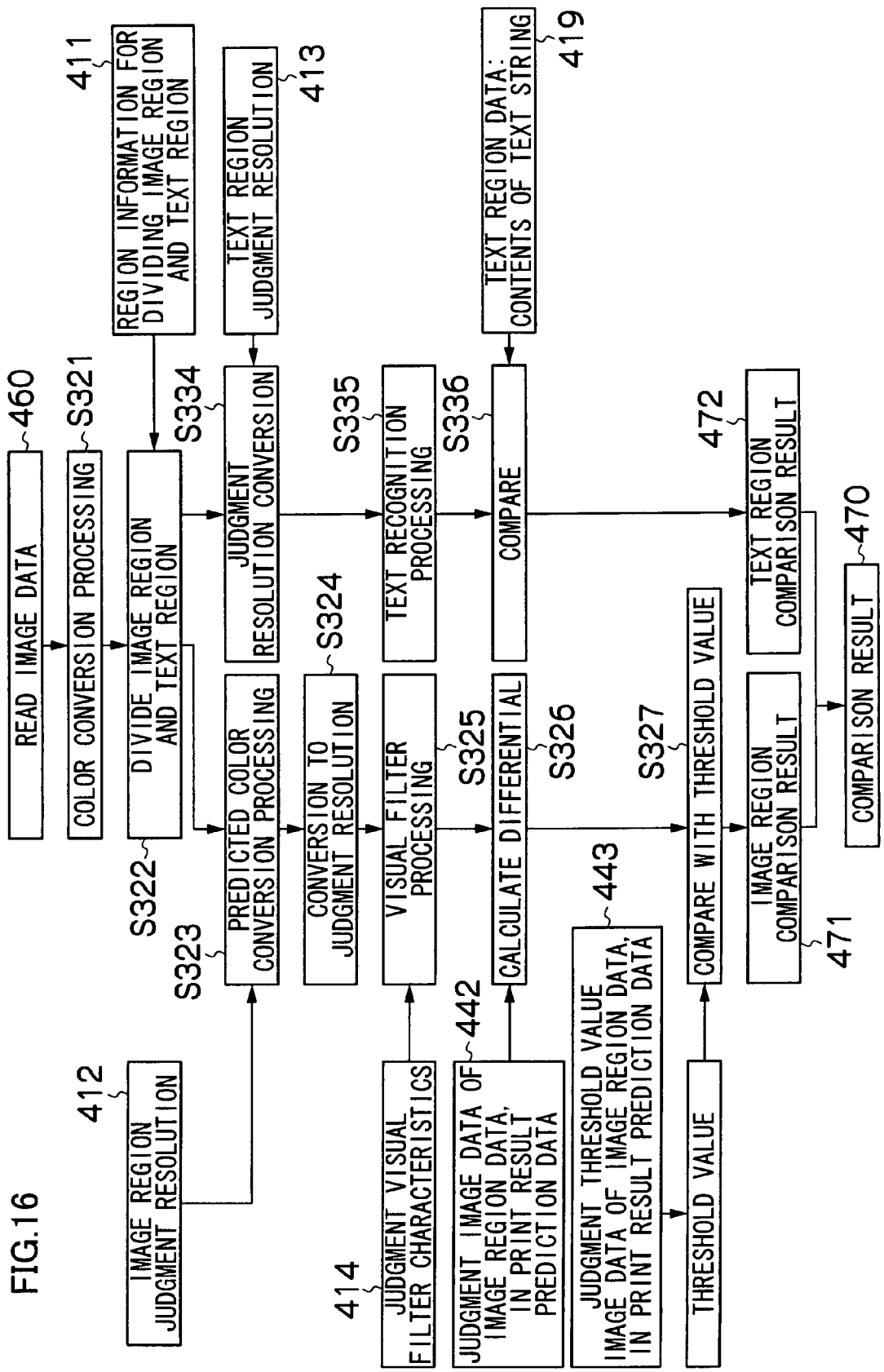
FIG. 16 is a flowchart showing the sequence of an embodiment of a print result judgment process.

The flowchart in FIG. 16 shows the sequence of a concrete embodiment of print result judgment processing (step S32 in FIG. 7).

In FIG. 16, firstly, commonly known color conversion processing is carried out on the read image data 460 outputted by the image reading unit 318 of the printing apparatus 30, in order to convert the color reproduction of the image reading unit 318 of the printing apparatus 30 into a desired color reproduction (step S321). Here, commonly known pre-processing, such as noise reduction, density correction, color balance adjustment, and the like, are carried out.

Next, processing is carried out in order to separate the image region and the text region in the read image data 460, on the basis of the region information 411 in the print quality data 410 in FIG. 9 (step S322). Accordingly, the read image data for the image region, which is perceived as an image by the human observer, and the read image data for the text region, which is perceived as text by the human observer, are extracted respectively from the read image data 460.

From step S322 in FIG. 16 onwards, the flow on the left-hand side of FIG. 16 shows the sequence of processing for the image region, and the flow on the right-hand side of FIG. 16 shows the sequence of processing for the text region.

In the flow on the left-hand side in FIG. 16, firstly, predicted color conversion processing is carried out in order to convert the color reproduction of the read image data for the image region into a color reproduction of the predicted color (step S323). Here, if the color coordinates system of the read image data is different to the color coordinates system of the image region data 441 in the print result prediction data 440, then the color coordinates are converted accordingly. For example, the color coordinates in the RGB color coordinates system are converted to color coordinates in the L*a*b* color coordinates system.

Next, judgment resolution conversion processing is carried out in order to convert the resolution of the read image data of the image region to the image region judgment resolution 412 of the print quality data 410 in FIG. 9 (step S324).

Thereupon, commonly known visual filter processing for determining the structural image quality of the image region is carried out on the read image data of the image region, on the basis of the judgment visual filter characteristics 414 in the print quality data 410 in FIG. 9 (step S325).

Next, the differential between the read image data of the image region and the judgment image data 442 of the image region data 441 in the print result prediction data 440 in FIG. 12 is calculated (step S326). More specifically, the differential is calculated for each of the pixels constituting the read image data of the image region.

Thereupon, the differentials for the respective pixels as determined at step S326 are compared with the respective threshold values of the judgment threshold value image data 443 of the image region data 441 in the print result prediction data 440 in FIG. 12, over the whole image region (step S327). Here, it is judged whether or not the read image data of the image region in the print result would be perceived, by the human observer, to be the same as the image data of the image region in the print content. The result of the comparison for the image region thus determined is set as the image region comparison result 471.

In the sequence on the right-hand side in FIG. 16, firstly, judgment resolution conversion processing is carried out in order to convert the resolution of the read image data of the text region to the text region judgment resolution 413 of the print quality data 410 in FIG. 9 (step S334).

Thereupon, the read image data of the text region is subjected to commonly known text recognition processing (step S335).

Subsequently, the text string obtained by the text recognition processing (step S335) (a code indicating the contents of the text recognized as text characters by the human observer when viewing the text region of the print result) is compared with the text string 419 in the text region data 444 of the print result prediction data 440 in FIG. 12 (in other words, the text string 419 of the text region data 418 in the print quality data 410 in FIG. 9) (step S336). Here, it is judged whether or not the read image data of the text region in the print result would be perceived to be the same as the image data of the text region in the print content, when the text is recognized by the human observer. The comparison result for the text region thus determined (in other words, the text string comparison result) is set as the text region comparison result 472.

The comparison result 471 for the image region and the comparison result 472 for the text region are outputted as an overall comparison result 470.

On the basis of the print result judgment processing described above (step S32 in FIG. 7), it is judged whether the print result is a success, or rather, a failure (step S34 in FIG. 7).

If the print result is the success, then the printing apparatus 30 erases the data received from the digital television apparatus 20, such as the print content and print quality data 410, and the data generated in the printing apparatus 30, such as the print data, print result prediction data 440, read image data 460, and the like (step S36 in FIG. 7).

Figure 17:
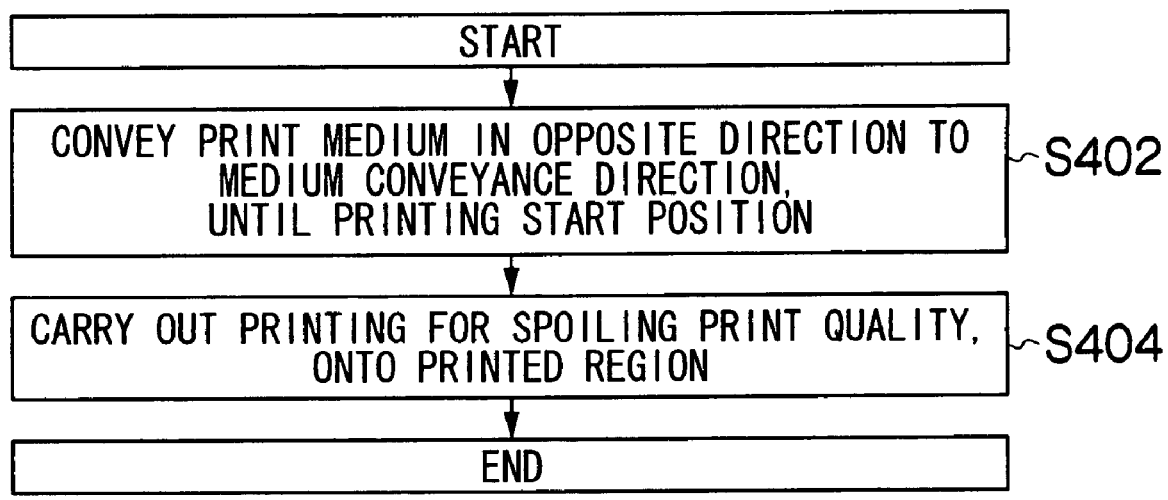
FIG. 17 is a flowchart showing the sequence of an embodiment of a print result invalidation process.

If the print result is not the success, then print result invalidation processing is implemented, even if the printing is still in progress (step S40 in FIG. 7). More specifically, as shown in the flowchart in FIG. 17, the print medium 16 is conveyed in the opposite direction to the medium conveyance direction S shown in FIG. 5 and returned to a prescribed printing start position (step S402), and printing which spoils the print quality (so-called "void printing") is performed onto the printed portion of the print medium 16, in such a manner that the portion that has already been printed becomes unusable (step S404).

Thereupon, a display asking the user whether or not to carry out a reprint is shown on the display unit 310 of the printing apparatus 30. It is judged whether or not a selection operation for reprinting has been performed at the operating unit 312 of the printing apparatus 30 (step S42 in FIG. 7), and if reprinting has not been selected, then the payment cancellation data 420 in FIG. 10 is encoded (step S44 in FIG. 7) by the encoding and decoding unit 306 of the printing apparatus 30, and then sent to the digital television apparatus 20 through the network interface 302 of the printing apparatus 30 (step S46 in FIG. 7). In the case of the public key system, the public key of the digital television apparatus 20, which is obtained previously from the digital television apparatus 20, is used as the encoding key.

In the digital television apparatus 20, as shown in the flowchart in FIG. 8, the encoded payment cancellation data 420 is received from the printing apparatus 30 (step S52), and is decoded using the prescribed decoding key (step S54), whereupon prescribed payment cancellation processing is carried out (step S56).

The foregoing description relates to the case where the shuttle type head such as that shown in FIG. 5 is used as the ink droplet ejection head (hereinafter, called "head"), which ejects droplets of ink onto the print medium 16, but the present invention is not limited to this, and needless to say, it may also be applied to cases where a so-called single scan type of head, which forms an image on the print medium 16 by means of a single scan, is used.

Figure 21:
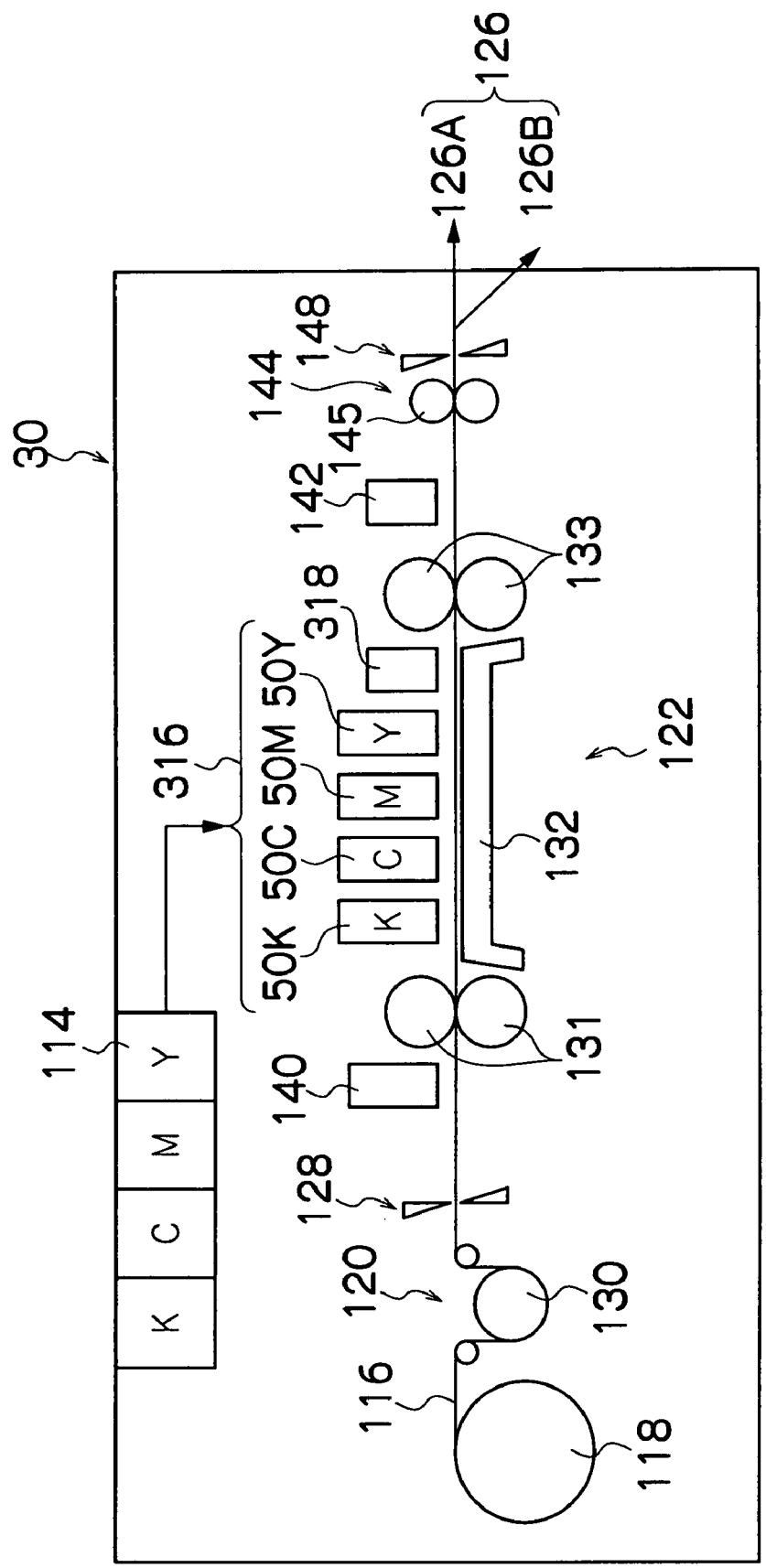
FIG. 21 is a schematic drawing showing the functional composition of an embodiment of a printing apparatus comprising a line head.

FIG. 21 is a general schematic drawing of an embodiment of a printing apparatus 30 having a single scanning type of head.

In FIG. 21, the printing apparatus 30 includes: the print unit 316 having the plurality of heads 50K, 50C, 50M and 50Y provided for respective colors of ink; an ink storing and loading unit 114 for storing inks to be supplied to the heads 50K, 50C, 50M and 50Y; a paper supply unit 118 for supplying a print medium 16, such as paper; a decurling unit 120 for removing curl in the print medium 16; a belt conveyance unit 122 disposed facing the nozzle surface of the print unit 316, for conveying the print medium 16 while keeping the print medium 16 flat; the image reading unit 318 for reading the print result (deposition state of ink droplets) produced by the print unit 316; and a paper output unit 126 for outputting the print medium 16 to the exterior after printing.

By ejecting liquids (inks) containing colorant (coloring material) onto the print medium 16, from the heads 50K, 50C, 50M and 50Y, an image is formed on the print medium 16.

In FIG. 21, a supply of rolled paper (continuous paper) is displayed as an embodiment of the paper supply unit 118, but it is also possible to use a supply unit which supplies cut paper that has been cut previously into sheets. In a case where rolled paper is used, a cutter 128 is provided. Therefore, the print medium 16 delivered from the paper supply unit 118 generally retains curl. In order to remove this curl, heat is applied to the print medium 16 in the decurling unit 120 by a heating drum 130 in the direction opposite to the direction of the curl. After decurling in the decurling unit 24, the cut print medium 16 is delivered to the conveyance unit 122.

After decurling, the cut print medium 16 is nipped and conveyed by the pair of conveyance rollers 131, and is supplied onto the platen 132. A pair of conveyance rollers 133 is also disposed on the downstream side of the platen 132 (the downstream side of the print unit 112), and the print medium 16 is conveyed at a prescribed speed by the joint action of the front side pair of conveyance rollers 131 and the rear side pair of conveyance rollers 133.

The platen 132 functions as a member which holds (supports) the print medium 16 while keeping the print medium 16 flat, as well as being a member which functions as the rear surface electrode and the like. The platen 132 in FIG. 21 has a width dimension greater than the width of the print medium 16, and at least the portion of the platen 132 opposing the nozzle surface of the print unit 316 and the sensor surface of the image reading unit 318 is a horizontal surface (flat surface).

A heating fan 140 is provided on the upstream side of the print unit 316 in the paper conveyance path formed by the conveyance unit 122. This heating fan 140 blows heated air onto the print medium 16 before printing, and thereby heats up the print medium 16. Heating the print medium 16 immediately before printing has the effect of making the ink dry more readily after landing on the paper.

FIG. 22 is a principal plan diagram showing the print unit 316 and the image reading unit 318 of the printing apparatus 30, and the peripheral region thereof.

As shown in FIG. 22, the print unit 316 is a so-called "full line head" in which a line head having a length corresponding to the maximum paper width is arranged in a direction (main scanning direction) that is perpendicular to the medium conveyance direction (sub-scanning direction). More specifically, the respective heads 50K, 50C, 50M and 50Y are line heads which each have a plurality of nozzles (liquid ejection ports) arranged through a length exceeding at least one edge of the maximum size of print medium 16 intended for use with the printing apparatus 30.

The heads 50K, 50C, 50M and 50Y corresponding to respective ink colors are disposed in the order, black (K), cyan (C), magenta (M) and yellow (Y), from the upstream side (left-hand side in FIG. 22), following the direction of conveyance of the print medium 16 (the medium conveyance direction). A color image can be formed on the print medium 16 by ejecting the inks including coloring material from the print heads 50K, 50C, 50M and 50Y, respectively, onto the print medium 16 while conveying the print medium 16.

The print unit 316, in which the full-line heads covering the entire width of the paper are thus provided for the respective ink colors, can record an image over the entire surface of the print medium 16 by performing the action of moving the print medium 16 and the print unit 316 relatively to each other in the medium conveyance direction (sub-scanning direction) just once (in other words, by means of a single sub-scan). Higher-speed printing is thereby made possible and productivity can be improved in comparison with a shuttle type head configuration in which an ink ejection head moves reciprocally in a direction (main scanning direction) which is perpendicular to the medium conveyance direction (sub-scanning direction).

Although a configuration with the four standard colors, K, C, M and Y, is described in the present embodiment, the combinations of the ink colors and the number of colors are not limited to those of the present embodiment, and light and/or dark inks can be added as required. For example, a configuration is possible in which ink ejection heads for ejecting light-colored inks such as light cyan and light magenta are added.

As shown in FIG. 21, the ink storing and loading unit 114 has ink tanks for storing inks of the colors corresponding to the respective heads 50K, 50C, 50M and 50Y, and the ink tanks are connected to the respective heads 50K, 50C, 50M and SOY, through tubing channels (not illustrated).

The image reading unit 318 has an image sensor (line sensor, or the like) for capturing an image of the print result of the print unit 316, and functions as a device to check for ejection defects such as blockages of the nozzles in the print unit 12 on the basis of the image read in by the image sensor.

A post-drying unit 142 is provided at a downstream stage from the image reading unit 318. The post-drying unit 142 is a device for drying the printed image surface, and it may comprise a heating fan, for example. A heating and pressurizing unit 144 is provided at a stage following the post-drying unit 142. The heating and pressurizing unit 144 is a device which serves to control the luster of the image surface, and it applies pressure to the image surface by means of pressure rollers 145 having prescribed surface undulations, while heating same. Accordingly, an undulating form is transferred to the image surface.

The printed object generated in this manner is outputted through the paper output unit 126. In the printing apparatus 30, a sorting device (not shown) is provided for switching the output pathway in order to sort the printed matter with the target print and the printed matter with the test print, and to send them to output units 126A and 126B, respectively. If the main image and the test print are formed simultaneously in a parallel fashion, on a large piece of printing paper, then the portion corresponding to the test print is cut off by means of the cutter (second cutter) 148. The cutter 148 is disposed immediately in front of the paper output section 126, and serves to cut and separate the main image from the test print section, in cases where a test image is printed onto the white margin of the image. Moreover, although omitted from the drawing, a sorter for collating and stacking the images according to job orders is provided in the paper output section 126A corresponding to the main images.

Figure 23A:
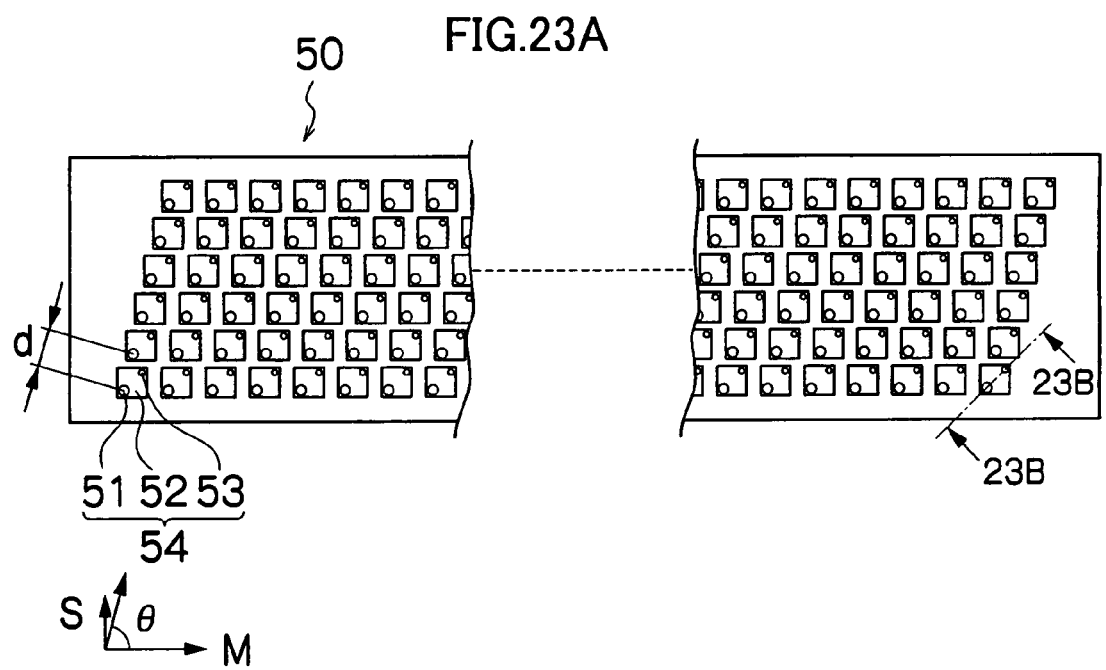
FIG. 23A is a plan perspective diagram showing an embodiment of the line head.

FIG. 23A is a plan view perspective diagram showing an embodiment of the basic overall structure of the head 50.

The head 50 shown in FIG. 23A has a structure in which a plurality of nozzles 51 (liquid ejection ports) which eject liquid toward a print medium (hereinafter, also simply called "medium") are arranged two-dimensionally through a length corresponding to the width of the print medium in the direction perpendicular to the direction of conveyance of the print medium (the sub-scanning direction indicated by arrow S in FIG. 23A), in other words, in the main scanning direction indicated by arrow M in FIG. 23A.

The head 50 includes a plurality of pressure chamber units 54, each having the nozzle 51, a pressure chamber 52 connected to the nozzle 51, and a liquid supply port 53, the pressure chamber units 54 being arranged in two directions, namely, the main scanning direction M and an oblique direction forming a prescribed acute angle θ (where 0°<θ<90°) with respect to the main scanning direction M. In FIG. 23A, in order to simplify the drawing, only a portion of the pressure chamber units 54 are depicted in the drawing.

In specific terms, the nozzles 51 are arranged at a uniform pitch d in the direction forming the prescribed acute angle of θ with respect to the main scanning direction M, and hence the nozzle arrangement can be treated as equivalent to a configuration in which the nozzles are arranged at an interval of d×cos θ in a single straight line following the main scanning direction M.

Figure 23B:
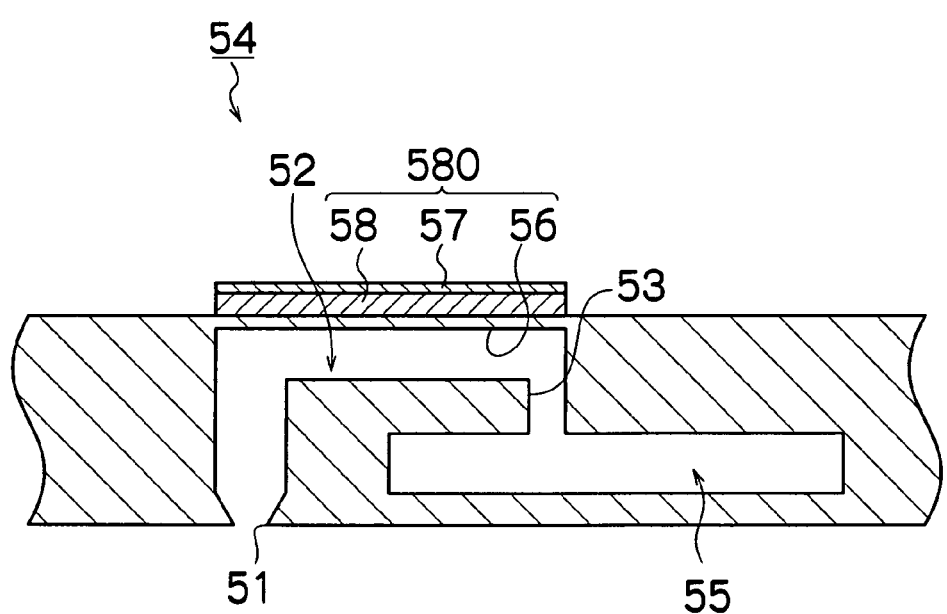
FIG. 23B is a cross-sectional diagram of same.

FIG. 23B shows a cross-sectional diagram along line 23B-23B in FIG. 23A of one of the aforementioned pressure chamber units 54, which forms one of the ejection elements constituting the head 50.

As shown in FIG. 23B, each pressure chamber 52 is connected to the common liquid chamber 55 through the liquid supply port 53. The common liquid chamber 55 is connected to the tank which forms the liquid supply tank (not illustrated), and the liquid supplied from the tank is distributed and supplied to the respective pressure chambers 52 through the common liquid chamber 55.

A piezoelectric body 58 is disposed on top of a diaphragm 56, which constitutes the ceiling of the pressure chamber 52, and an individual electrode 57 is provided on top of this piezoelectric body 58. The diaphragm 56 is earthed and also functions as a common electrode. A piezoelectric actuator 580, which forms a device for generating a droplet ejection force, is constituted by the diaphragm 56, the individual electrode 57 and the piezoelectric body 58.

When a prescribed drive voltage is applied to the individual electrode 57 of the piezoelectric actuator 580, the piezoelectric body 58 deforms, thereby changing the volume of the pressure chamber 52, and this results in a change in the pressure inside the pressure chamber 52, which causes the liquid to be ejected from the nozzle 51. When the volume of the pressure chamber 52 returns to normal after the ejection of the liquid, new ink is supplied to the pressure chamber 52 from the common liquid chamber 55 through the liquid supply port 53.

FIG. 23A shows the embodiment where the plurality of nozzles 51 are arranged two-dimensionally in order to achieve a structure whereby a high-resolution image can be formed at high-speed onto the print medium 116, but the head according to the present invention is not limited in particular to the structure in which the plurality of nozzles 51 are arranged two-dimensionally, and it may also adopt a structure where a plurality of nozzles 51 are arranged one-dimensionally. Furthermore, the pressure chamber unit 54 shown in FIG. 23B is merely an example of the ejection element constituting a part of the head and the invention is not limited in particular to a case of this kind. For example, instead of disposing the common liquid chamber 55 below the pressure chamber 52 (in other words, towards the nozzle surface from the pressure chamber 52), it is also possible to dispose the common liquid chamber 55 above the pressure chamber 52 (in other words, on the side of the pressure chamber 52 reverse to the side of the nozzle surface). Furthermore, it is also possible to eject droplets of ink by using heating bodies instead of the piezoelectric bodies 58, for example.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A printing apparatus, comprising:
a printing device which prints onto a prescribed print medium;
a print result prediction device which predicts a print result on the print medium in accordance with print subject image data and a printing condition of the printing device, and accordingly creates and outputs print result prediction data including image region print result prediction data for an image region and text region print result prediction data for a text region, the image region and the text region being recognized as an image and a text, respectively, by a person viewing a correct print result, the text region print result prediction data including a text code;
an image reading device which optically reads in the print result on the print medium and accordingly outputs print result read data, the image reading device being disposed on a downstream side of a printing position of the print medium and on an upstream side of an output position of the print medium in a conveyance path along which the print medium is conveyed;
a print result judgment device which judges whether the print result on the print medium is successful or unsuccessful in accordance with the print result prediction data outputted from the print result prediction device and the print result read data outputted from the image reading device,
wherein the print subject image data includes at least one of text region image data for the text region and image region image data for the image region, and
the print result prediction device creates the print result prediction data while taking into account print quality data which includes region information for mutually separating the image region and the text region in a print content, the image region image data of the print content, and a text string composed of a code sequence that indicates a content of the text region of the print content; and
an extraction device which separately extracts, in accordance with the region information, image region print result read data for the image region and text region print result read data for the text region from the print result read data obtained by reading in the print result on the print medium by the image reading device,
wherein the print result judgment device makes a comparison between the image region print result read data extracted from the print result read data and the image region print result prediction data in the print result prediction data, and judges whether the print result on the print medium is successful or unsuccessful in accordance with result of the comparison.

2. The printing apparatus as defined in claim 1, wherein the print result judgment device makes a second comparison between the text region print result read data extracted from the print result read data and the text region print result prediction data in the print result prediction data, and judges whether the print result on the print medium is successful or unsuccessful in accordance with result of the second comparison.

3. A printing apparatus, comprising:
a printing device which prints onto a prescribed print medium;
a print result prediction device which predicts a print result on the print medium in accordance with print subject image data and a printing condition of the printing device, and accordingly creates and outputs print result prediction data including image region print result prediction data for an image region and text region print result prediction data for a text region, the image region and the text region being recognized as an image and a text, respectively, by a person viewing a correct print result, the text region print result prediction data including a text code;
an image reading device which optically reads in the print result on the print medium and accordingly outputs print result read data, the image reading device being disposed on a downstream side of a printing position of the print medium and on an upstream side of an output position of the print medium in a conveyance path along which the print medium is conveyed;
a print result judgment device which judges whether the print result on the print medium is successful or unsuccessful in accordance with the print result prediction data outputted from the print result prediction device and the print result read data outputted from the image reading device;
a data storage device which stores the print subject image data, the print result prediction data and the print result read data; and
a data erasure device which, when the print result judgment device has judged the print result on the print medium successful, erases the print subject image data, the print result prediction data and the print result read data from the data storage device.

4. A printing apparatus, comprising:
a printing device which prints onto a prescribed print medium;
a print result prediction device which predicts a print result on the print medium in accordance with print subject image data and a printing condition of the printing device, and accordingly creates and outputs print result prediction data including image region print result prediction data for an image region and text region print result prediction data for a text region, the image region and the text region being recognized as an image and a text, respectively, by a person viewing a correct print result, the text region print result prediction data including a text code;
an image reading device which optically reads in the print result on the print medium and accordingly outputs print result read data, the image reading device being disposed on a downstream side of a printing position of the print medium and on an upstream side of an output position of the print medium in a conveyance path along which the print medium is conveyed;
a print result judgment device which judges whether the print result on the print medium is successful or unsuccessful in accordance with the print result prediction data outputted from the print result prediction device and the print result read data outputted from the image reading device;
a data storage device which stores the print subject image data, the print result prediction data and the print result read data;
a data erasure device which, when the print result judgment device has judged the print result on the print medium successful, erases the print subject image data, the print result prediction data and the print result read data from the data storage device; and
a print result invalidation device which, when the print result judgment device has judged the print result on the print medium unsuccessful, performs an invalidation print onto an image having been printed on the print medium in such a manner that the image having been printed becomes invalidated,
wherein after the print result invalidation device has performed the invalidation print, the printing device is enabled to print an image same with the image having been invalidated.

* * * * *